United States Patent
Lim et al.

(10) Patent No.: US 9,661,591 B2
(45) Date of Patent: May 23, 2017

(54) METHOD FOR REDUCING TRANSMISSION POWER FOR SOUNDING REFERENCE SIGNAL AND TERMINAL THEREFOR

(75) Inventors: Suhwan Lim, Anyang-si (KR); Manyoung Jung, Anyang-si (KR); Yoonoh Yang, Anyang-si (KR); Sangwook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 14/388,537

(22) PCT Filed: Jun. 18, 2012

(86) PCT No.: PCT/KR2012/004783
§ 371 (c)(1),
(2), (4) Date: Sep. 26, 2014

(87) PCT Pub. No.: WO2013/157698
PCT Pub. Date: Oct. 24, 2013

(65) Prior Publication Data
US 2015/0055580 A1    Feb. 26, 2015

Related U.S. Application Data

(60) Provisional application No. 61/625,018, filed on Apr. 16, 2012.

(51) Int. Cl.
*H04W 52/36* (2009.01)
*H04W 52/40* (2009.01)
(Continued)

(52) U.S. Cl.
CPC .......... *H04W 52/367* (2013.01); *H04B 7/024* (2013.01); *H04W 52/146* (2013.01);
(Continued)

(58) Field of Classification Search
CPC . H04W 52/367; H04W 52/365; H04W 52/40; H04W 52/325; H04W 52/243;
(Continued)

(56) References Cited

U.S. PATENT DOCUMENTS

2011/0274092 A1* 11/2011 Liu ........................ H04W 72/10
370/335
2011/0287804 A1* 11/2011 Seo ...................... H04W 52/146
455/522

(Continued)

FOREIGN PATENT DOCUMENTS

JP    2011-29770 A    2/2011
KR    10-2010-0088083 A    8/2010
(Continued)

OTHER PUBLICATIONS

R4-111809, LG Electronics, "Considerations on SRS simultaneous transmission for intra-band CA in Rel-10", 3GPP TSG RAN WG4 Meeting #58AH, Shanghai, China, Apr. 11-15, 2011.*

*Primary Examiner* — Kwang B Yao
*Assistant Examiner* — Moo Ryong Jeong
(74) *Attorney, Agent, or Firm* — Birch, Stewart, Kolasch & Birch, LLP

(57) ABSTRACT

One embodiment of the present invention provides a method for transmitting a signal in a terminal. The method for transmitting a signal in a terminal comprises the steps of: setting a maximum power reduction (MPR) value for signal transmission power, wherein the maximum power reduction value is independently set for a sounding reference signal (SRS), and the maximum power reduction value which is set for the SRS is different from a maximum power reduction value which is set for another signal; and transmitting the SRS with transmission power which is set according to the set maximum power reduction value.

7 Claims, 15 Drawing Sheets

(51) Int. Cl.
| | | |
|---|---|---|
| *H04W 52/32* | (2009.01) | |
| *H04W 52/24* | (2009.01) | |
| *H04W 52/28* | (2009.01) | |
| *H04W 52/14* | (2009.01) | |
| *H04B 7/02* | (2006.01) | |
| *H04B 7/024* | (2017.01) | |
| *H04L 27/26* | (2006.01) | |
| *H04L 5/00* | (2006.01) | |

(52) U.S. Cl.
CPC ....... *H04W 52/243* (2013.01); *H04W 52/244* (2013.01); *H04W 52/245* (2013.01); *H04W 52/283* (2013.01); *H04W 52/325* (2013.01); *H04W 52/365* (2013.01); *H04W 52/40* (2013.01); *H04L 5/001* (2013.01); *H04L 5/0035* (2013.01); *H04L 5/0051* (2013.01); *H04L 27/2602* (2013.01); *H04L 27/2636* (2013.01); *Y02B 60/50* (2013.01)

(58) Field of Classification Search
CPC ............. H04W 52/146; H04W 52/283; H04W 52/244; H04W 52/245; H04B 7/024; Y02B 60/50; H04L 27/2636; H04L 5/001; H04L 5/0051; H04L 5/0035; H04L 27/2602
See application file for complete search history.

(56) References Cited

U.S. PATENT DOCUMENTS

| | | | |
|---|---|---|---|
| 2012/0039268 A1* | 2/2012 | Hakkinen | H04L 5/001 370/329 |
| 2012/0087257 A1* | 4/2012 | Larsson | H04L 5/001 370/252 |
| 2013/0039289 A1 | 2/2013 | Lee et al. | |
| 2014/0071902 A1* | 3/2014 | Sorrentino | H04W 52/325 370/329 |

FOREIGN PATENT DOCUMENTS

| | | | | |
|---|---|---|---|---|
| KR | WO 2010087622 A2 * | 8/2010 | ......... | H04W 52/146 |
| KR | 10-2011-0110700 A | 10/2011 | | |

* cited by examiner

FIG. 7
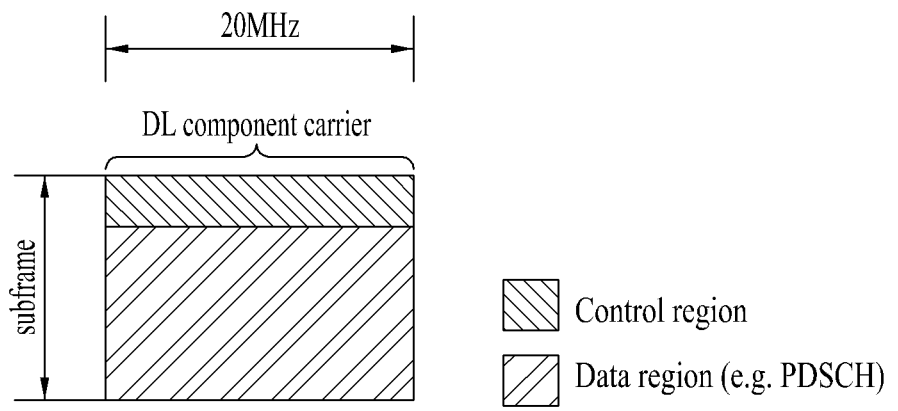
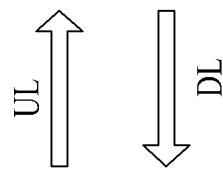
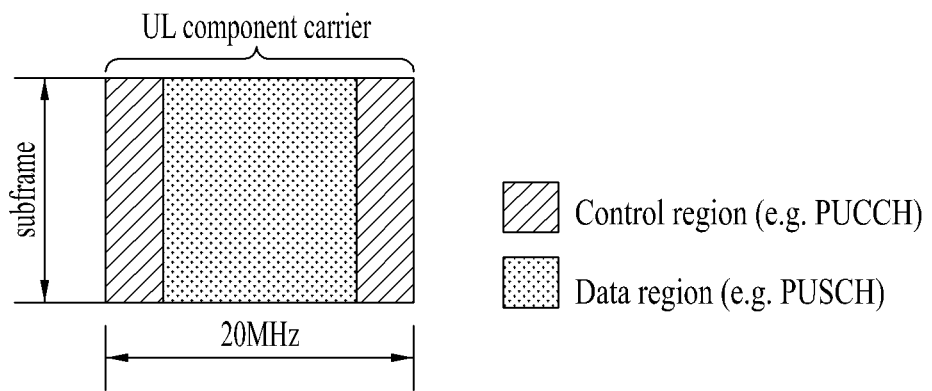
Single component carrier (a) Minimum SRS BW for 20MHz system BW (b) Maximum SRS BW for 20MHz system BW FIG. 18
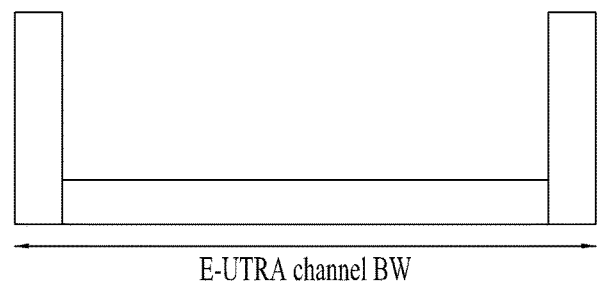
E-UTRA channel BW
PUCCH Over-provisioning
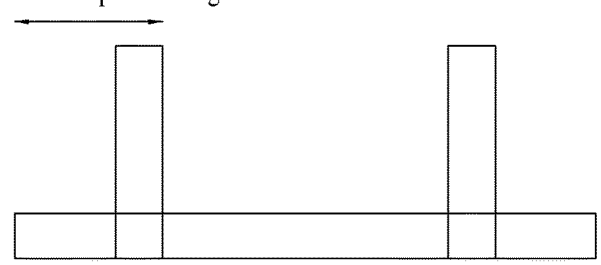
FIG. 19A
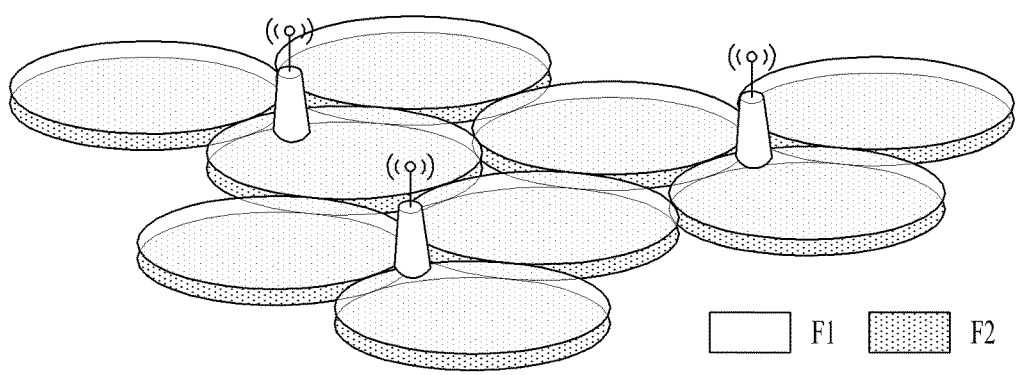

METHOD FOR REDUCING TRANSMISSION POWER FOR SOUNDING REFERENCE SIGNAL AND TERMINAL THEREFOR

CROSS REFERENCE TO RELATED APPLICATIONS

This application is the National Phase of PCT/KR2012/004783 filed on Jun. 18, 2012, which claims priority under 35 U.S.C. 119(e) to U.S. Provisional Application No. 61/625,018 filed on Apr. 16, 2012, all of which are hereby expressly incorporated by reference into the present application.

TECHNICAL FIELD

The present invention relates to a method for reducing transmission power for a sounding reference signal.

BACKGROUND ART

Next-generation multimedia wireless communication systems under recent active study are required to additionally process and transmit various types of information including video data and radio data, beyond initial voice-oriented services. The wireless communication systems aim at reliable communication between a plurality of users irrespective of locations and mobility of the users. However, a wireless channel experiences a number of problems such as path loss, shadowing, fading, noise, limited bandwidth, limited power of terminals, and interference between different users. Other challenges faced in designing a wireless communication system include resource allocation, mobility issues related to fast changing physical channels, portability, security, and privacy.

When a transmission channel experiences deep fading, a receiver has difficulty in determining a transmitted signal unless another version or a replica of the transmitted signal is additionally transmitted. Resources corresponding to another version or a replica are called diversity and are one of the most significant factors contributing to reliable transmission on a wireless channel. Use of diversity can maximize data transmission capacity or data transmission reliability. A system that implements diversity by means of multiple transmit antennas and multiple receive antennas is called a multiple input multiple output (MIMO) system.

The MIMO system implements diversity by space frequency block code (SFBC), space time block code (STBC), cyclic delay diversity (CDD), frequency switched transmit diversity (FSTD), time switched transmit diversity (TSTD), precoding vector switching (PVS), spatial multiplexing (SM), etc.

FIG. 1 illustrates the configuration of a general MIMO communication system.

As illustrated in FIG. 1, if the numbers of transmit antennas and receive antennas are simultaneously increased to NT and NR, respectively, a theoretical channel transmission capacity is increased in proportion to the number of antennas, unlike the case in which only either a transmitter or a receiver uses multiple antennas. Accordingly, it is possible to increase transmission rate and to remarkably improve frequency efficiency. Theoretically, the transmission rate according to an increase in channel transmission capacity can be increased by an amount obtained by multiplying an increase rate Ri indicated in the following Equation 1 by a maximum transmission rate Ro in case of using one antenna.

For example, in a MIMO communication system using four transmit antennas and four receive antennas, it is possible to theoretically obtain a transmission rate which is four times the transmission rate of a single antenna system. After an increase in the theoretical capacity of the MIMO system was first proved in the mid-1990s, various techniques for substantially improving data transmission rate have been actively developed. Several of these techniques have already been incorporated in a variety of wireless communication standards such as the 3rd generation mobile communication and the next-generation wireless local area network.

$$R = \min(N_T, N_R) \quad \text{Equation 1}$$

Active research up to now related to MIMO technology has focused on a number of different aspects, including research into information theory related to computation of MIMO communication capacity in various channel environments and in multiple access environments, research into wireless channel measurement and model derivation of a MIMO system, and research into space-time signal processing technologies for improving transmission reliability and transmission rate.

In a terminal structure having a general MIMO channel environment, a signal received by each receive antenna may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{Equation 2}$$

$$Hx + n$$

A channel between transmit and receive antennas may be distinguished according to transmit and receive antenna indexes and a channel from transmit antenna j to receive antenna i is denoted by hij. When a precoding scheme is used as in LTE during transmission, transmission signal x may be expressed by:

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{Equation 3}$$

where Wij of precoding matrix W denotes a weight between the i-th transmit antenna and the j-th $W_o$ information. If transmission powers of transmitted signals are $P_1$, $P_2$, ..., $P_{NT}$, transmission information, transmission powers of which are adjusted, may be expressed by diagonal matrix P as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{Equation 4}$$

Unlike this, a coordinated multi-point (COMP) scheme is technology in which data information is transmitted to one UE using transmit antennas of multiple cells having different PSCs and cell-specific pilot signals (reference signals), thereby enabling link selection and improving throughput/capacity caused by transmit diversity.

However, generally, when the quality of a radio link in a specific cell is degraded, the COMP scheme proposed up to now all disconnects currently used settings and performs resetting by searching for a serving cell regardless of the quality of the radio link.

The currently proposed scheme, however, maintains the quality of the radio link in a specific cell and, if the quality of the radio link of an SIR value of an RS of a specific cell is degraded makes a COMP agreement again using maintained cells by disconnecting the specific cell of COMP, thereby seamlessly transmitting data.

Meanwhile, one of systems considered beyond the 3rd generation is an orthogonal frequency division multiplexing (OFDM) system capable of attenuating an inter-symbol interference effect with low complexity. The OFDM system converts serially input data into N parallel data and transmits the parallel data on N orthogonal subcarriers. The subcarriers maintain frequency orthogonality. Orthogonal frequency division multiple access (OFDMA) is a multiple access scheme of achieving multiple access by independently providing a part of available subcarriers to each user in a system using OFDM as a modulation scheme.

FIG. 2 illustrates a wireless communication system.

Referring to FIG. 2, the wireless communication system includes at least one base station (BS) 20. Each BS 20 provides a communication service to a specific geographical area (generally called a cell) 20a, 20b, or 20c. Each cell may further be divided into a plurality of areas (called sectors). A user equipment (UE) 10 may be fixed or mobile. The term UE may be replaced with mobile station (MS), user terminal (UT), subscriber station (SS), wireless device, personal digital assistant (PDA), wireless modem, handheld device, etc. The BS 20 is generally a fixed station communicating with the UE 10 and the term BS is interchangeable with evolved Node B (eNB), base transceiver system (BTS), access point (AP), etc.

Downlink (DL) refers to communication from a BS to a UE and uplink (UL) refers to communication from a UE to a BS. A transmitter may be a part of a BS and a receiver may be a part of a UE, on DL, whereas the transmitter may be part of the UE and the receiver may be part of the BS, on UL.

The wireless communication system may be any of a MIMO system, a multiple input single output (MISO) system, a single input single output (SISO) system, and a single input multiple output (SIMO) system. The MIMO system uses a plurality of transmit antennas and a plurality of receive antennas. The MISO system uses a plurality of transmit antennas and a single receive antenna. The SISO system uses a single transmit antenna and a single receive antenna. The SIMO system uses a single transmit antenna and a plurality of receive antennas.

Hereinbelow, a transmit antenna refers to a physical or logical antenna used for transmitting one signal or stream and a receive antenna refers to a physical or logical antenna used for receiving one signal or stream.

A 3rd generation partnership project long term evolution (3GPP LTE) system employs MIMO. The LTE system will be described below in more detail.

FIG. 3 illustrates the structure of a radio frame in the 3GPP LTE system.

Referring to FIG. 3, a radio frame is divided into 10 subframes, each subframe including two slots. The slots of the radio frame are numbered from 0 to 19. A unit time during which one subframe is transmitted is called a transmission time interval (TTI). The TTI may be considered to be a scheduling unit for data transmission. For example, one radio frame may be 10 ms long, one subframe may be 1 ms long, and one slot may be 0.5 ms long.

This radio frame structure is purely exemplary and thus the number of subframes in a radio frame or the number of slots in a subframe may vary.

FIG. 4 illustrates the structure of a resource grid for one UL slot in the 3GPP LTE system.

Referring to FIG. 4, a UL slot includes a plurality of OFDM symbols in the time domain and NUL resource blocks (RBs) in the frequency domain. An OFDM symbol represents one symbol period, also called a single carrier-frequency division multiple access (SC-FDMA) symbol, an OFDMA symbol, or a symbol period according to systems. An RB is a resource allocation unit including a plurality of subcarriers in the frequency domain. The number of RBs included in a UL slot, NUL, depends on a UL bandwidth set for a cell. Each element of the resource grid is called a resource element (RE).

One RB includes 7×12 REs, that is, 7 OFDM symbols in the time domain by 12 subcarriers in the frequency domain, which is purely exemplary. Thus, the numbers of subcarriers and OFDM symbols in an RB are not limited to the above specific values. Rather, the number of OFDM symbols or the number of subcarriers in an RB may vary. The number of OFDM symbols may change according to a cyclic prefix (CP) length. For example, 7 OFDM symbols are included in an RB in the case of a normal CP, whereas 6 OFDM symbols are included in an RB in the case of an extended CP.

A resource grid for one UL slot in 3GPP LTE system of FIG. 4 may also be applied to the resource grid for a DL slot.

FIG. 5 illustrates the structure of a DL subframe.

The DL subframe includes two slots in the time slot, each slot including 7 OFDM symbols in the case of a normal CP. Up to three OFDM symbols (up to four OFDM symbols in a bandwidth of 1.4 Mhz) at the start of the first slot in the subframe are used for a control region to which control channels are allocated and the other OFDM symbols of the subframe are used for a data region to which a physical downlink shared channel (PDSCH) is allocated. The PDSCH is a channel on which a BS transmits data to a UE.

A physical downlink control channel (PDCCH) may deliver resource allocation information (a DL grant) and a transport format for a downlink shared channel (DL-SCH), resource allocation information (a UL grant) about an uplink shared channel (UL-SCH), paging information of a paging channel (PCH), system information on the DL-SCH, resource allocation information about a higher-layer control message such as a random access response transmitted on the PDSCH, a set of transmission power control (TPC) commands for individual UEs of a UE group, voice over Internet protocol (VoIP) activation information, etc. Control information transmitted on the above-described PDCCH is called downlink control information (DCI).

Now, a detailed description will be given of DL reference signals (RSs).

In the 3GPP LTE system, two types of DL RSs are defined for unicast services, a common RS or cell-specific RS (CRS) and a dedicated RS or UE-specific RS (DRS).

The CRS is an RS shared among all UEs within a cell, for use in acquisition of channel state information and handover measurement. The DRS is an RS specific to a UE, for use in data demodulation. Thus it can be said that CRS is a cell-specific RS and DRS is a UE-specific RS.

A UE measures CRSs and transmits feedback information such as channel quality information (CQI), a precoding matrix indicator (PMI), and a rank indicator (RI) to a BS. Then the BS performs DL frequency scheduling using the feedback information.

To transmit RSs to the UE, the BS allocates resources, in consideration of the amount of radio resources to be allocated to the RSs, exclusive positions of CRSs and DRSs, the positions of a synchronization channel (SCH) and a broadcast channel (BCH), and the density of the DRSs.

If a relatively large amount of resources are allocated to RSs, high channel estimation performance can be achieved but data rate is relatively decreased. On the other hand, if a relatively small amount of resources are allocated to RSs, high data rate can be achieved but the resultant low RS density may cause degradation of channel estimation performance. Accordingly, efficient resource allocation to RSs, considering channel estimation and data rate is an important factor to system performance.

Meanwhile, the DRS is used only for data demodulation, whereas the CRS is used for both channel information acquisition and data demodulation in the 3GPP LTE system. Especially, the CRS is transmitted in each subframe in a broadband, through each antenna port of a BS. For example, for two transmit antennas in the BS, CRSs are respectively transmitted through antenna port 0 and antenna port 1. For four transmit antennas in the BS, CRSs are respectively transmitted through antenna port 0 to antenna port 3.

FIG. 6 illustrates the structure of a UL subframe in the 3GPP LTE system.

Referring to FIG. 6, a UL subframe may be divided into a control region and a data region. A physical uplink control channel (PUCCH) including uplink control information is allocated to the control region. A physical uplink shared channel (PUSCH) including user data is allocated to the data region. In order to maintain a single carrier property, RBs allocated to one UE are contiguous in the frequency domain. That is, the UE cannot simultaneously transmit the PUCCH and the PUSCH.

The PUCCH for one UE is allocated to an RB pair in a subframe. The RBs of the RB pair occupy different subcarriers in first and second slots. Thus, the frequencies of the RBs of the RB pair allocated to the PUCCH are changed over a slot boundary. As the UE transmits UL control information on different subcarriers over time, a frequency diversity gain can be achieved.

UL control information transmitted on the PUCCH includes a hybrid automatic repeat request acknowledgement/negative acknowledgement (HARQ ACK/NACK), a channel quality indicator (CQI) indicating a DL channel state, and a scheduling request (SR) requesting UL radio resource allocation.

The PUSCH is mapped to a transport channel, uplink shared channel (UL-SCH). UL data transmitted on the PUSCH may be a transport block which is a data block for a UL-SCH transmitted during a TTI. The transport block may be user information. Alternatively, the UL data may be multiplexed data. The multiplexed data may be data obtained by multiplexing the transport block for the UL-SCH with control information. For example, the control information multiplexed for the data may include a CQI, a PMI, an HARQ ACK/NACK, an RI, etc. Alternatively, the UL data may include the control information only.

Meanwhile, a high data rate is required. The most basic and stable solution to the need for a high data rate is to increase bandwidth.

However, frequency resources are saturated at present and various techniques are partially used in a broad frequency band. To secure a broad bandwidth to satisfy higher data rate requirements for this reason, the concept of designing each of scattered bands so as to meet basic requirements for operating an independent system and aggregating a plurality of bands into one system has been introduced. This concept is called carrier aggregation (CA). Each independent operable band is defined as a component carrier (CC).

CA is adopted in an LTE-advanced (LTE-A) system as well as in the LTE system.

Carrier Aggregation

A CA system is a wireless communication system that configures a desired broad band by aggregating one or more carriers each having a narrower bandwidth than a target broad band. The CA system is also called a multiple carrier system, a bandwidth aggregation system, etc. CA systems may be categorized into a contiguous CA system using contiguous carriers and a non-contiguous CA system using non-contiguous carriers. It should be understood that a multi-carrier system or a CA system covers both a contiguous CC case and a non-contiguous CC case in the following description.

A guard band may be interposed between carriers in the contiguous CA system. To ensure backward compatibility with a legacy system, each of one or more carriers that are aggregated may use bandwidth defined in the legacy system. For example, the 3GPP LTE system supports 1.4, 3, 5, 10, 15 and 20 MHz. Alternatively, a broad band may be configured by defining a new bandwidth, instead of using the bandwidths of the legacy system.

A UE may simultaneously transmit or receive one or more carriers according to the capacity thereof in the CA system.

FIG. 7 illustrates an example of communication on a single CC. This communication may be conducted in the LTE system.

Referring to FIG. 7, data transmission and reception are performed in a single DL band and a single UL band corresponding to the DL band in a typical frequency division duplex (FDD) wireless communication system. A BS and a UE transmit and receive data and/or control information that is scheduled in the units of subframes. The data is transmitted and received in the data region configured in a UL/DL subframe and the control information is transmitted and received in the control region configured in the UL/DL subframe. For transmission and reception of the data and control information, the UL/DL subframe carries signals on various physical channels. While FIG. 7 is described mainly in the context of FDD, the same description is also applicable to a time division duplex (TDD) scheme in which a radio frame is divided into UL and DL in the time domain.

FIG. 8 illustrates an example of communication on multiple CCs.

FIG. 8 may correspond to an example of communication in the LTE-A system.

The LTE-A system uses CA, bandwidth aggregation, or spectrum aggregation technology by collecting a plurality of UL/DL frequency blocks to use a broader frequency band.

Each frequency block is transmitted on a CC. In this disclosure, a CC may refer to a frequency block for CA or the center subcarrier of the frequency block. These two meanings are used interchangeably.

On the other hand, the 3GPP LTE system supports different configurations of a DL bandwidth and a UL bandwidth based on one CC. Although the 3GPP LTE system supports a maximum of 20 MHz and different configurations of a UL bandwidth and a DL bandwidth, only one CC is supported for each of UL and DL.

However, spectrum aggregation (also called bandwidth aggregation or carrier aggregation) supports a plurality of CCs. For example, if five CCs are allocated as granularity of each carrier having a bandwidth of 20 MHz, up to a bandwidth of 100 MHz can be supported.

A pair of one DL CC or UL CC and one DL CC may correspond to one cell. One cell basically includes one DL CC and optionally includes a UL CC. Accordingly, it may be said that a UE communicating with a BS through a plurality of DL CCs is provided with a service by a plurality of serving cells. In this case, a plurality of DL CCs may be configured in DL and only one CC may be used in UL. Then, it can be said that the UE is provided a service by a plurality of serving cells in DL and is provided a service only by one serving cell in UL.

In this meaning, serving cells may be divided into a primary cell and a secondary cell. The primary cell operates in a primary frequency and is a cell designated as a primary cell when a UE performs an initial connection establishment process, initiates a connection re-establishment process, or performs a handover process. The primary cell is also referred to as a reference cell. The secondary cell operates in a secondary frequency, may be configured after RRC connection is established, and may be used to provide an additional radio resource. At least one primary cell may always be set and a secondary cell may be added/modified/released by higher layer signaling (e.g. an RRC message).

Referring to FIG. 8, a bandwidth of 100 MHz may be supported by aggregating five 20-MHz CCs on UL/DL. The CCs may be contiguous or non-contiguous in the frequency domain. For convenience, the bandwidth of a UL CC and the bandwidth of a DL CC in FIG. 9 are identically and symmetrically illustrated. However, the bandwidth of each CC may be independently determined. For example, the bandwidths of UL CCs may be configured into 5 MHz (UL CC0)+20 MHz (UL CC1)+20 MHz (UL CC2)+20 MHz (UL CC3)+5 MHz (UL CC4). In addition, asymmetrical CA is also possible by configuring different numbers of UL CCs and DL CCs. Asymmetrical CA may occur due to a limited available frequency band or may be artificially implemented according to network setting. For example, despite the existence of N CCs in a total system band, a frequency band that a specific UE can receive may be limited to M (<N) CCs. Various CA parameters may be configured cell-specifically, UE group-specifically, or UE-specifically.

While a UL signal and a DL signal are transmitted on one-to-one mapped CCs in the illustrated case of FIG. 8 by way of example, the number of actual CCs carrying signals may vary depending on network setting or the type of the signals.

For instance, when a scheduling command is transmitted through DL CC1 on DL, data corresponding to the scheduling command may be transmitted through another DL CC or a UL CC. In addition, control information related to a DL CC may be transmitted through a specific UL CC on UL irrespective of DL-UL CC mapping. DCI may be transmitted through a specific DL CC in a similar manner.

FIG. 9 is a block diagram for explaining an SC-FDMA transmission scheme which is a UL access scheme adopted in the 3GPP LTE system.

For LTE UL, SC-FDMA is adopted, which is similar to OFDM but reduces the power consumption and power amplifier cost of a portable terminal by reducing a peak to average power ratio (PAPR).

SC-FDMA is very similar to OFDM in that a signal is transmitted on subcarriers by fast Fourier transform (FFT) and inverse fast Fourier transform (IFFT). SC-FDMA is also similar to OFDM in that a simple equalizer can be used in the frequency domain by using a guard interval (CP) against inter-symbol interference (ISI) caused by multi-path fading. However, compared to OFDM, SC-FDMA improves the power efficiency of a transmitter by reducing the PAPR of the transmitter by about 2 to 3 dB through additional unique techniques.

A problem encountered with a conventional OFDM transmitter is that signals on subcarriers along the frequency axis are converted into signals on the time axis by IFFT. Since IFFT is a process of parallel execution of the same operation, IFFT increases PAPR.

Referring to FIG. 9, in SC-FDMA, information is first subjected to discrete Fourier transform (DFT) 102 before signals are mapped to subcarriers to solve the above problem. The DFT-spread signals (or DFT-precoded signals) are mapped to subcarriers through subcarrier mapping 13 and converted into signals into the time axis through IFFT 14.

SC-FDMA is advantageous for transmission power efficiency because the PAPR of a time-domain signal after IFFT 14 is not greatly increased as opposed to OFDM due to the correlation among DFT 12, subcarrier mapping 13, and IFFT 14.

The transmission scheme of performing IFFT after DFT spreading is called SC-FDMA.

SC-FDMA is advantageous in that it is robust against multi-path fading channels due to a similar structure to OFDM and the problem of a PAPR increase encountered with OFDM is completely solved through IFFT. Consequently, the power amplifier can be efficiently used. Meanwhile, SC-FDMA is also called DFT spread OFDM (DFT-s-OFDM).

That is, SC-FDMA can reduce a PAPR or cubic metric (CM). Furthermore, the non-linear distortion range of the power amplifier can be avoided by using an SC-FDMA transmission scheme, thereby increasing the transmission power efficiency of a UE having limited power consumption. Accordingly, user throughput can be increased.

3GPP is actively working on standardization of LTE-A evolved from LTE. Although SC-FDMA-based techniques competed with OFDM-based techniques as in the standardization process of LTE, clustered-DFT-s-OFDM which allows non-contiguous resource allocation has been adopted. The LTE-A system will be described below in detail.

FIG. 10 is a block diagram for explaining clustered DFT-s-OFDM adopted as a UL access scheme in the LTE-A standard.

The main feature of a clustered DFT-s-OFDM scheme is that DFT-s-OFDM can flexibly cope with a frequency selective fading environment by enabling frequency selective resource allocation.

Compared to SC-FDMA which is the conventional LTE UL access scheme, clustered DFT-s-OFDM adopted as an LTE-A UL access scheme allows non-contiguous resource allocation. Therefore, UL transmission data may be partitioned into a plurality of clusters.

That is, while the LTE system maintains the single carrier property for UL, the LTE-A system allows non-contiguous allocation of DFT-precoded data on the frequency axis or simultaneous transmission of a PUSCH and a PUCCH.

DETAILED DESCRIPTION OF THE INVENTION

Technical Problems

A UE that supports intra-contiguous CA transmits and receives two CCs using one radio frequency (RF) chain. If the UE performs a coordinated multi-point (COMP) operation, a scheme of reducing a maximum output power, i.e. a maximum power reduction (MPR) scheme is set, resulting in the probability of reducing the coverage of a BS.

Therefore, one disclosure of the present invention is to perform transmission with higher output by adjusting an MPR value for a sounding reference signal (SRS) transmitted to inform a BS of channel state information between the BS and the UE according to the geographical location of the UE.

Technical Solutions

According to an aspect of the present invention to achieve the above object, a sounding reference signal (SRS) can be transmitted at a higher power by independently setting power backoff for the SRS, i.e. MPR, between CCs or coordinated cells, as opposed to a conventional scheme, when multi-cluster simultaneous transmission is performed by an LTE-A UE supporting CA, which is one of main techniques of 3GPP LTE-A.

According to an aspect of the present invention, when coordinated multi-point (COMP) communication is performed for one UE, an MPR value for restricting the transmission power of an SRS is independently set separately from a normal MPR value, that is, an MPR value applied to another channel with respect to each BS. Therefore, cell coverage of each BS is enlarged and thus an excellent service for the UE can be ensured.

According to another aspect of the present invention, in order to optimize coverage widely ensured using an SRS transmitted with a higher transmission power, a BS transmits a PUCCH in a PUCCH region other than an edge of channel bandwidth using PUCCH over-provisioning and thus excellent data throughput can be obtained by using an adaptive modulation coding (AMC) scheme of increasing a data rate in a cell having the best SRS reception level and decreasing the data rate in the other cells.

That is, independent MPR only for an SRS is applied without using MPR for restricting a maximum output power of a UE performing multi-cluster simultaneous transmission in CA which is currently discussed in 3GPP WG RAN4. Therefore, reduction in cell coverage generated when conventional MPR is applied can be prevented. In addition, wider cell coverage can be ensured and data can be more stably received, in a heterogeneous network or during a COMP operation, by applying a PUCCH over-provisioning scheme capable of being performed in Release-10 together with independent SRS power backoff.

According to an aspect of the present invention to achieve the above object, provided herein is a method for transmitting signal by a user equipment. The method includes setting a maximum power reduction (MPR) value for a signal transmission power, wherein the MPR value is independently set for sounding reference signal (SRS) and the MPR value set for the SRS is different form an MPR value set for another signal; and transmitting the SRS with a transmission power set according to the MPR value set for the SRS.

The MPR value set for the SRS may be indicated through network signaling from a serving cell or may be known to the user equipment.

Cell breathing may be performed through independent setting of the MPR value for the SRS.

The MPR value may be independently set for the SRS when a first cell supports carrier aggregation together with a second cell or when the first cell performs a coordinated multi-point (COMP) operation together with the second cell.

Independent setting of the MPR value for the SRS may be performed when the user equipment moves out of coverage of the first cell into coverage of the second cell or out of coverage of the second cell into coverage of the first cell.

The MPR value independently set for the SRS may not be used when the user equipment moves to an overlapping region of the first cell and the second cell again.

The first cell may be a primary cell and the second cell may be a secondary cell or the first cell may be a macrocell or the second cell may be a picocell.

The method may further include receiving control signal through an uplink control channel, wherein the control signal is received in a data region other than an edge of a channel band.

The method may further include receiving control signal by physical uplink control channel (PUCCH) over-provisioning.

According to an aspect of the present invention to achieve the above object, provided herein is a user equipment. The user equipment includes a controller for setting a maximum power reduction (MPR) value for a signal transmission power, wherein the MPR value is independently set for sounding reference signal (SRS) and the MPR value set for the SRS is different form an MPR value set for another signal; and a transceiver for transmitting the SRS with a transmission power set according to the MPR value set for the SRS.

The MPR value set for the SRS may be indicated through network signaling from a serving cell or may be known to the user equipment.

Cell breathing may be performed through independent setting of the MPR value for the SRS.

According to an aspect of the present invention to achieve the above object, provided herein is a method for controlling a transmission power of a user equipment by a serving cell. The method includes independently setting a maximum power reduction (MPR) value for a sounding reference signal (SRS) when the serving cell supports carrier aggregation (CA) together with another cell or performs a coordinated multi-point (COMP) operation together with another cell; transmitting the set MPR value to the user equipment through network signaling; and receiving the SRS from the user equipment.

Cell breathing may be performed through independent setting of the MPR value.

According to an aspect of the present invention to achieve the above object, provided herein is a serving base station. The serving base station includes a controller for independently setting a maximum power reduction (MPR) value for a sounding reference signal (SRS) when the serving base station supports carrier aggregation (CA) together with another cell or performs a coordinated multi-point (COMP) operation together with another cell; a transmitter for transmitting the set MPR value to a user equipment through network signaling; and a receiver for receiving the SRS from the user equipment.

Advantageous Effects

According to the present disclosure, cell coverage decrease caused by a conventional MPR can be reduced by transmitting independent MPR as opposed to MPR applied to an existing channel for an SRS transmitted by a UE.

That is, when multi-cluster simultaneous transmission is performed by an LTE-A UE supporting CA, which is one of main techniques of 3GPP LTE-A, an SRS can be transmitted at a higher power by independently setting power backoff for an SRS, i.e. MPR, between CCs or coordinated cells, as opposed to a conventional scheme.

DESCRIPTION OF DRAWINGS

FIG. 7 illustrates an example of communication on a single CC. This communication may be conducted in the LTE system.

FIG. 18 illustrates in detail the concept of PUCCH over-provisioning to protect an adjacent channel in DL.

FIG. 19a to FIG. 19e illustrate various scenarios of extending cell coverage using independent MPR and PUCCH over-provisioning for an SRS according to the present invention, when heterogeneous eNode Bs support intra-band CA.

BEST MODE FOR CARRYING OUT THE INVENTION

Figure 1:
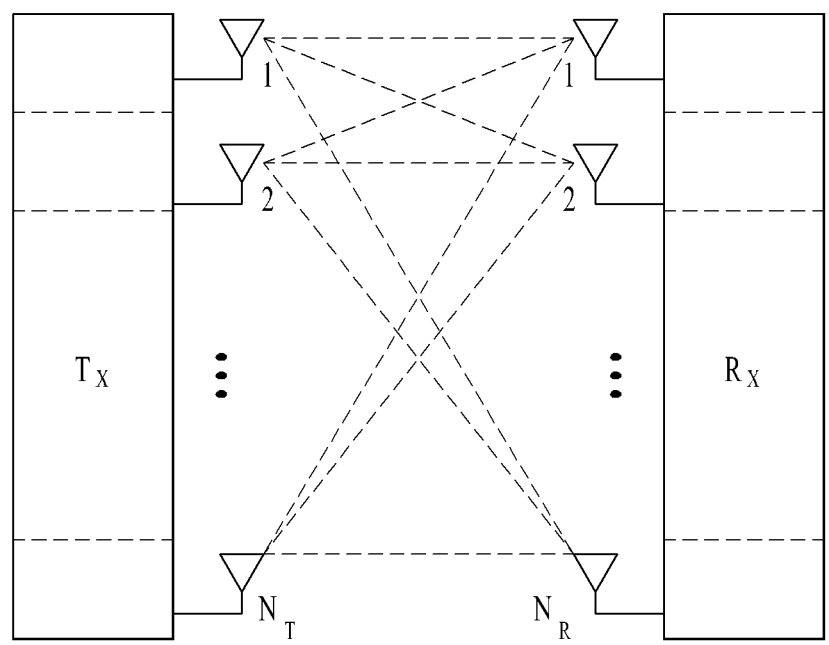
FIG. 1 illustrates the configuration of a general MIMO communication system
Figure 2:
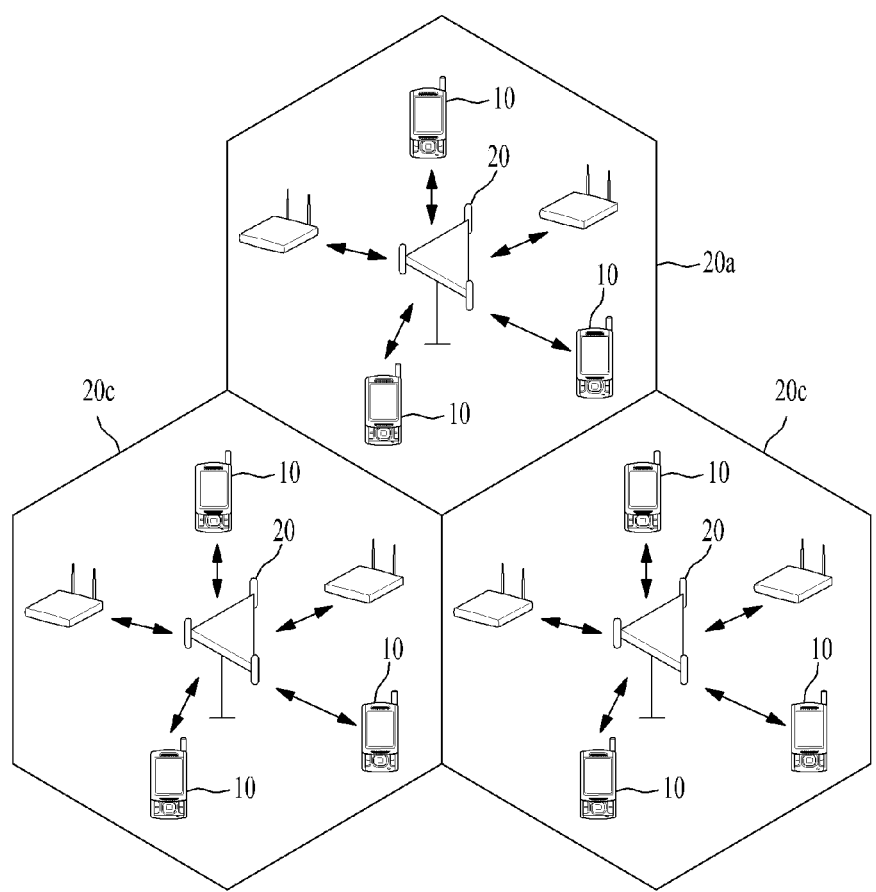
FIG. 2 illustrates a wireless communication system
Figure 3:
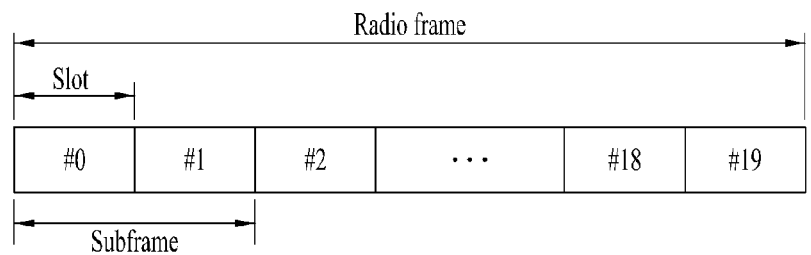
FIG. 3 illustrates the structure of a radio frame in a 3GPP LTE system.
Figure 4:
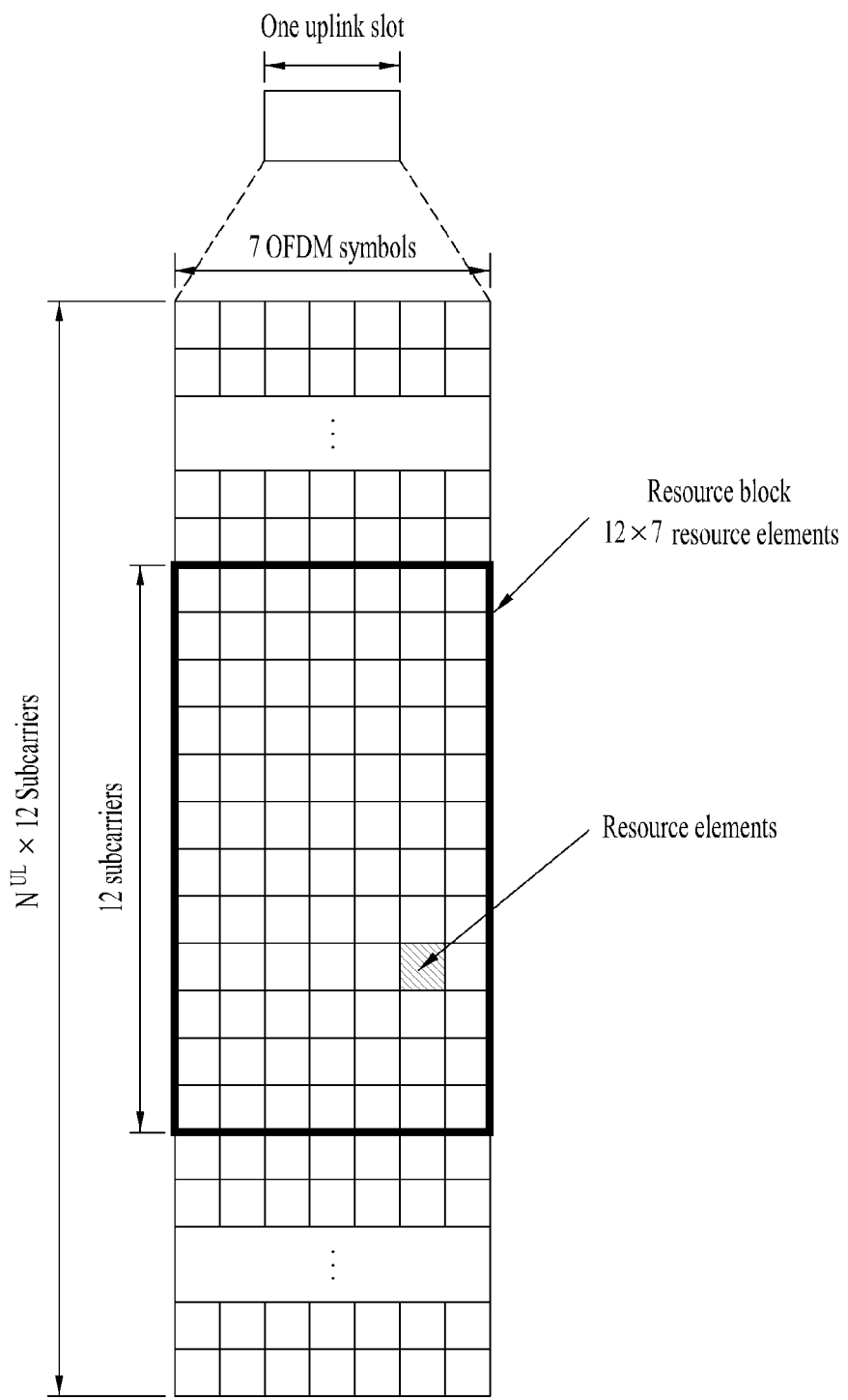
FIG. 4 illustrates the structure of a resource grid for one UL slot in the 3GPP LTE system.
Figure 5:
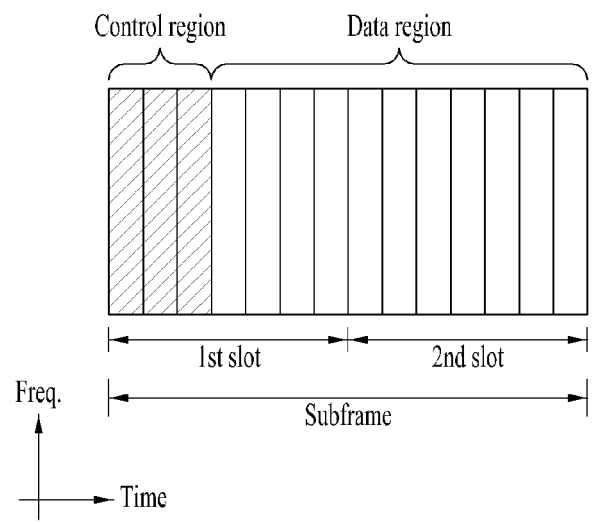
FIG. 5 illustrates the structure of a DL subframe.
Figure 6:
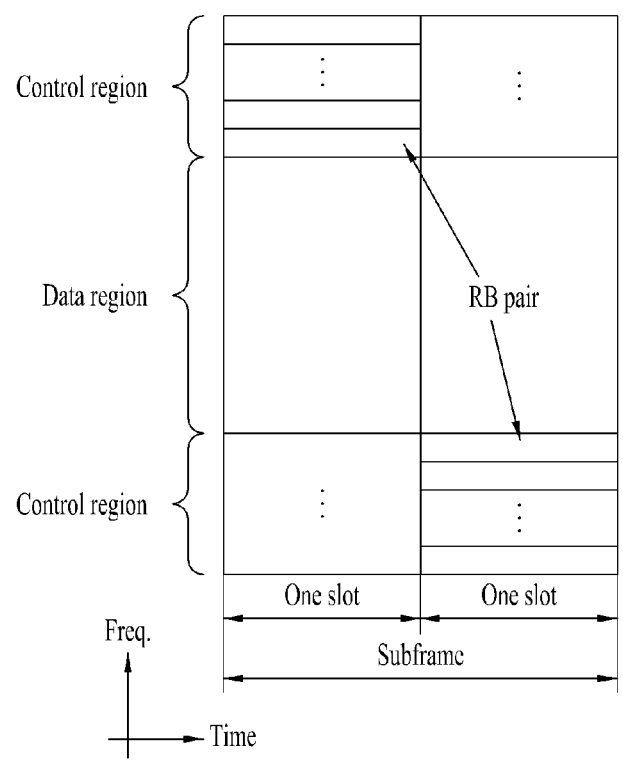
FIG. 6 illustrates the structure of a UL subframe in the 3GPP LTE system.
Figure 8:
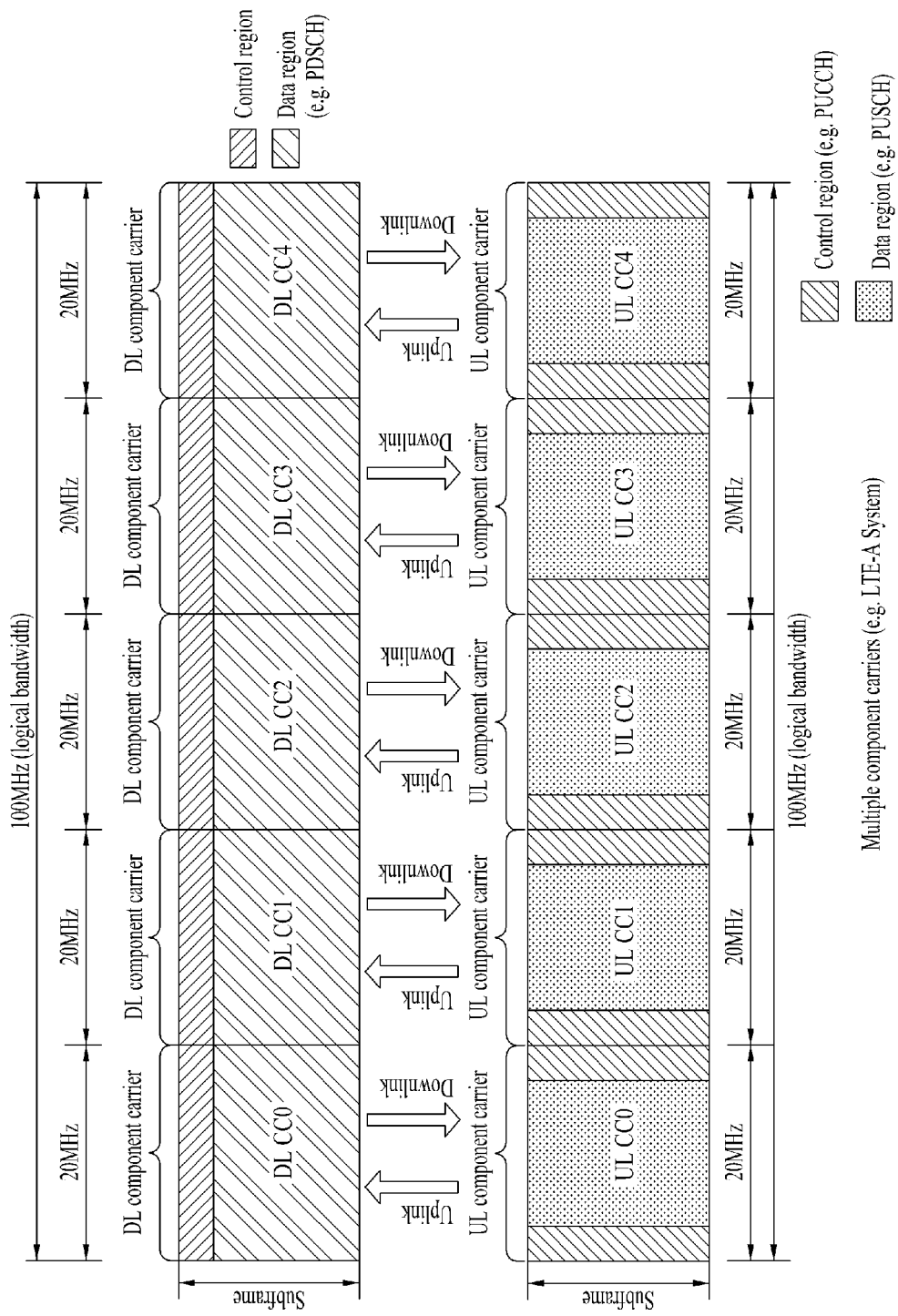
FIG. 8 illustrates an example of communication on multiple CCs.
Figure 9:
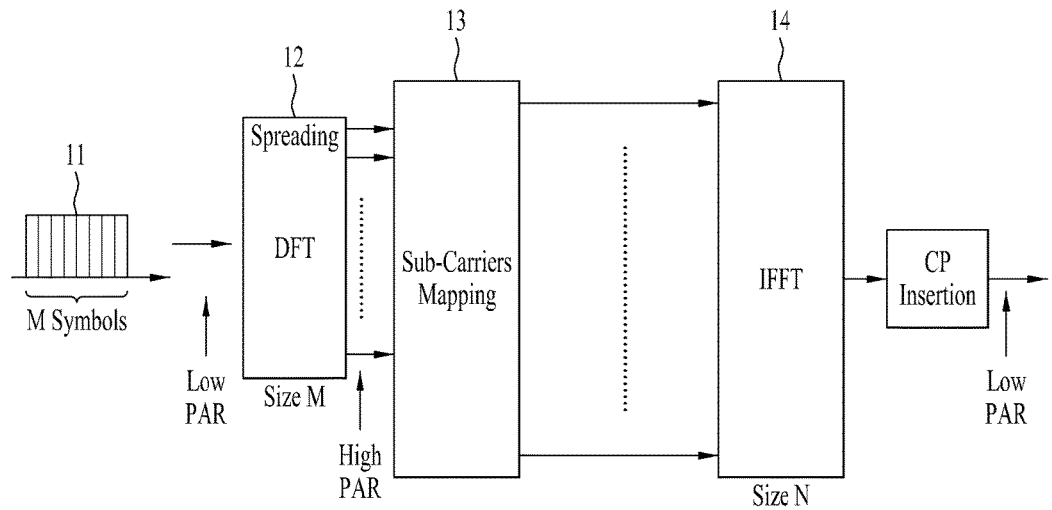
FIG. 9 is a block diagram for explaining an SC-FDMA transmission scheme which is a UL access scheme adopted in the 3GPP LTE system.
Figure 10:
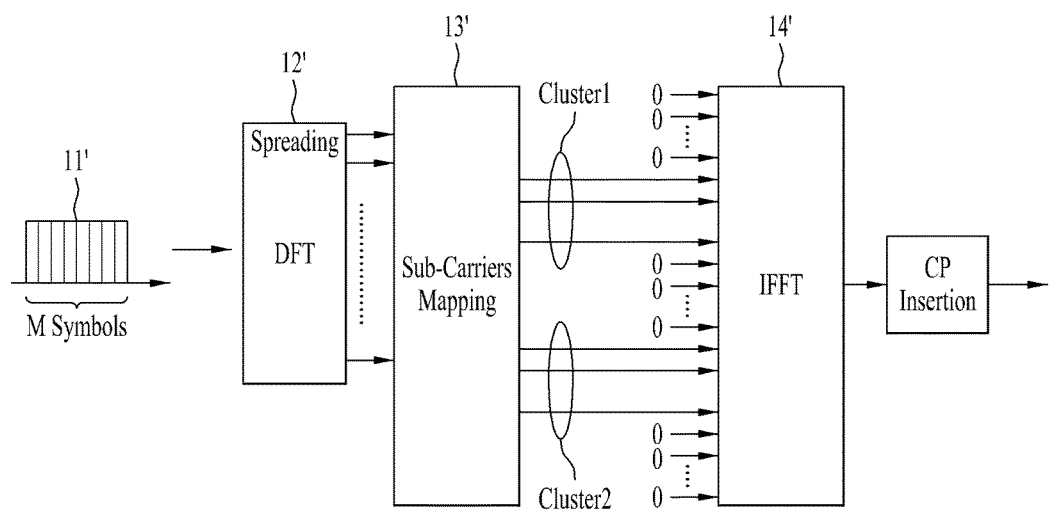
FIG. 10 is a block diagram for explaining clustered DFT-s-OFDM adopted as a UL access scheme in the LTE-A standard.

The following technology can be used for various radio access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (Wi-MAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA on DL and SC-FDMA on UL. LTE-advanced (LTE-A) is an evolved version of 3GPP LTE.

The terminology used in the present disclosure is for the purpose of describing particular embodiments only and is not intended to be limiting of the invention. Unless otherwise defined, all terms used herein have the same meaning as commonly understood by one of ordinary skill in the art to which this invention pertains and should not be interpreted as having an excessively comprehensive meaning or as having an excessively narrow meaning. If technical terms used herein fail to accurately express the technical idea of the present invention, such terms should be replaced with technical terms that the person skilled in the art can correctly understand. The general terms used herein should be interpreted according to dictionary definitions or context and should not be interpreted as having an excessively narrow meaning.

Singular expressions used in the present disclosure include plural forms unless context clearly dictates otherwise. In the present application, it should be understood that terms such as "include" or "have" should not be construed to always include all of the components or steps disclosed in the specification and some components or steps may be omitted or other components or steps may be further added.

The terms such as ordinals of first, second, and the like are used to explain a variety of components but the components should not be limited by the terms. That is, the terms are used only to distinguish one component from other components. For example, a first component may be referred to as a second component without departing from the scope of rights of the present invention and likewise a second component may be referred to as a first component.

If it is expressed that a component is "connected" or "coupled" to another component, this may mean that the component is directly connected or coupled to another component but an intervening element may be present therebetween. On the other hand, when a component is mentioned as being "directly connected" or "directly coupled" to another component, it is to be understood that no other elements are present therebetween.

Preferred embodiments of the present invention will now be described with reference to the accompanying drawings in which like numbers refer to like or similar elements and a repetitive description will be omitted. In describing the present invention, if a detailed explanation of a related known function or construction is considered to obscure the subject matter of the present invention, such explanation has been omitted. The accompanying drawings of the present invention aim to facilitate understanding of the present invention and should not be construed as limiting the present invention. The technical idea of the present invention should be interpreted to embrace all such modifications, equivalents, or substitutes in addition to the attached drawings.

Hereafter, the term user equipment (UE) is used but the UE may be referred to as terminal, mobile equipment (ME), mobile station (MS), user terminal (UT), subscriber station (SS), wireless device, handheld device, or access terminal (AT). Also, the UE may be a portable device having a communication function such as mobile phone, personal digital assistant (PDA), smartphone, wireless modem, a laptop computer, etc. or may be a device which is not portable and has a communication function, such as a PC or a vehicle-mounted device.

Figure 11:
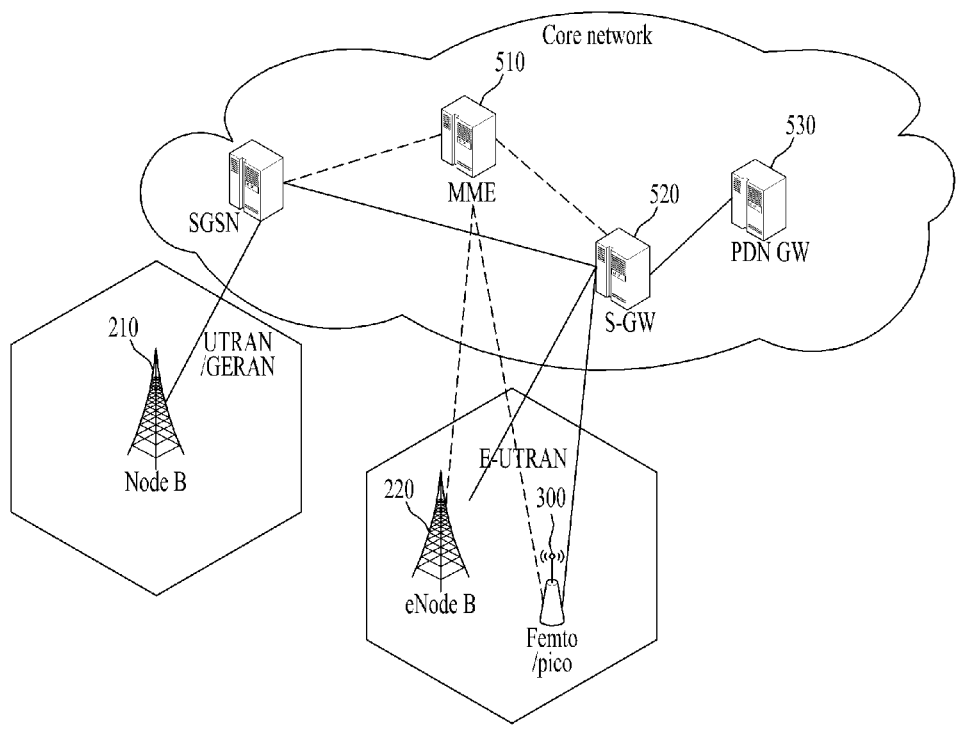
FIG. 11 illustrates the configuration of an evolved mobile communication network.

FIG. 11 illustrates the configuration of an evolved mobile communication network.

One distinctive feature of the network configuration illustrated in FIG. 11 lies in that it is based on the 2 tier model of an eNode B 220 of an evolved UMTS terrestrial radio access network (E-UTRAN) and a gateway of a core network. It may be considered that the eNode B 200 has the function of a radio network controller (RNC) of a Node B 210 of a conventional UMTS system and the gateway has the function of a serving GPRS support mode/gateway GPRS support node (SGSN/GGSN) of a conventional system, although not having the exactly same function.

Another distinctive feature is that a control plane and a user plane between an access network and a core network are exchanged via different interfaces. Compared to the conventional UMTS system in which one Iu interface exists between the RNC and the SGSN, two separate interfaces, i.e., S1-MME and S1-U, are used since a mobility management entity (MME) which handles processing of a control signal is structured to be separated from the gateway (GW). There are two types of GWs: a serving gateway (SG) and a packet data network GW (PDN-GW or P-GW).

Meanwhile, the 3rd generation or 4th generation mobile communication system continues efforts to increase cell capacity for the purpose of supporting a high-capacity service such as multimedia content, streaming, etc. and an interactive service.

As various high-capacity transmission techniques have been demanded along with the development of communication and multimedia technology, radio capacity can be increased by allocating more frequency resources. However, there is a limit in allocating more frequency resources to multiple users because frequency resources are limited.

An approach to using a high frequency band and reducing a cell radius has been made to increase cell capacity. Use of picocells or femtocells with smaller cell radiuses enables use of a higher frequency band and thus transmission of more information, compared to a conventional cellular system. Despite this advantage, picocells or femtocells increase cost because more eNode Bs should be installed in the same area.

As an approach to increasing cell capacity by means of such small-size cells, femtocells/picocells have recently been proposed. A picocell is a small cell with a smaller radius than a macrocell and a femtocell is a cell managed by a home eNode B (HeNB). Since the picocell is installed by a service provider and the femtocell is installed by a user, it is assumed in the 3GPP system that the service provider is not accurately aware of the existence of the femtocell.

A femtocell/picocell 300 was initially developed centering upon RAN WG3 in the name of an HeNB in 3GPP. The eNode B 220 or the Node B 210 is called a macrocell in a relative sense. Hereinbelow, the Node B 210 and the eNode B 220 are referred to as macrocells 200.

In this disclosure, a description will be given in the context of 3GPP and the term (e)Node B is used to address both a Node B and an eNode B.

Interfaces indicated by dotted lines serve to transmit control signals between the eNode B 220 and the MME 510 and between the MME 510 and the femtocell/picocell 300. Interfaces indicated by solid lines serve to transmit data of the user plane.

Figure 12:
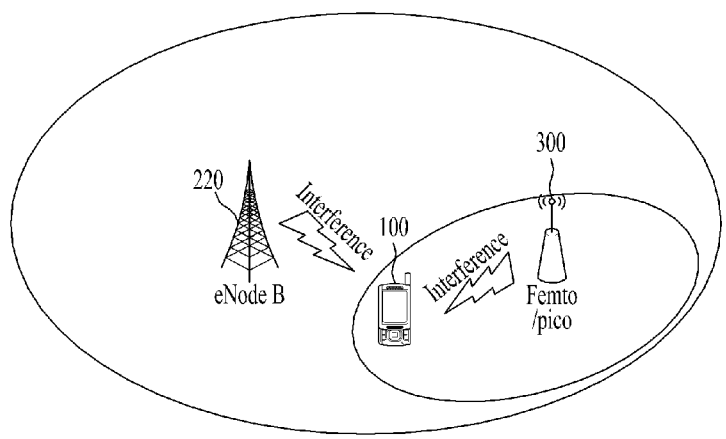
FIG. 12 illustrates coexistence of a picocell/femtocell with a macrocell within the coverage of the macrocell.

FIG. 12 illustrates coexistence of a picocell/femtocell with a macrocell within the coverage of the macrocell.

As illustrated in FIG. 12, if a heterogeneous network such as the picocell/femtocell exists within the coverage of the macrocell, interference therebetween is problematic.

That is, the picocell or the femtocell is located within the macrocell and the UE located at the boundary of the overlapped cells is subject to interference due to signals transmitted from the cells.

For example, when a UE 100 connected to the picocell 300 moves to the boundary of the picocell 300, the UE 100 may be disconnected from the picocell 300. This implies that the coverage of the picocell 300 becomes smaller than a service provider has intended.

As another example, when the UE 100 connected to the macrocell 220 moves to the service area of the femtocell 300, the UE 100 may be disconnected from the macrocell 220 due to interference from the femtocell 300. This implies that a shadowing area has been produced in the macrocell 220.

The first example is referred to as a macro-pico problem and the second example is referred to as a macro-femto problem. These two problems have emerged as challenging issues to be solved.

The most fundamental method to eliminate interference is to use different frequencies in heterogeneous networks. However, the frequency division is not favorable on the part of a service provider because frequency is a rare, expensive resource.

In this context, the 3GPP has tried to solve the inter-cell interference problem by time division.

As one of interference cooperation methods in recent 3GPP, active study about enhanced inter-cell interference coordination (eICIC) has been conducted.

Time division introduced into LTE Release-10 is called eICIC indicating that it has been evolved relative to conventional frequency division. In eICIC, an interfering cell is called an aggressor cell or a primary cell and an interfered cell is called a victim cell or a secondary cell. The aggressor cell or primary cell discontinues data transmission in a specific subframe, while a UE maintains a connection to the victim cell or secondary cell in the specific subframe. That is, when the macrocell-picocell or the macrocell-femtocell coexists, one eNode B temporarily stops signal transmission to a UE that is subject to considerable interference in a certain region, thereby hardly transmitting an interference signal.

In the macro-pico problem or macro-femto problem, a macrocell may be an aggressor cell or a primary cell and a picocell may be a victim cell or a secondary cell, or vice versa.

Meanwhile, a specific subframe in which data transmission is stopped is called an almost blank subframe (ABS) and a subframe configured as an ABS carries no data except mandatory control information. The mandatory control information is, for example, a cell-specific reference signal (CRS). In the current 3GPP LTE/LTE-A specification, the CRS signal is present on 0th, 4th, 7th, and 11th OFDM symbols in each subframe in the time domain.

In a next-generation mobile communication system, multimedia broadcast/multicast service (MBMS) has been proposed for broadcast service.

Figure 13:
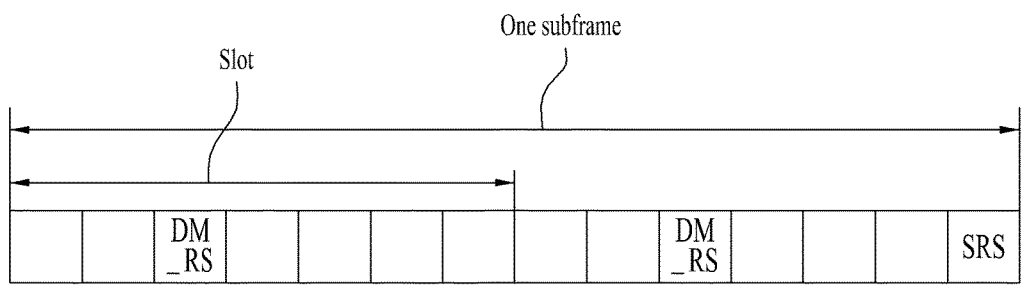
FIG. 13 illustrates a UL subframe including an SRS symbol.

FIG. 13 illustrates a UL subframe including an SRS symbol.

An SRS is used for power control, timing advance, and semi-selective scheduling on a frequency resource at an eNode B. SRS generation and SRS mapping to a physical resource can be easily understood by those skilled in the art with reference to TS 36.211 and thus a detailed description thereof will not be given.

General characteristics of an SRS for single carrier transmission are as follows.

An SRS transmission bandwidth does not include a PUCCH region.
An SRS is always transmitted on the last SC-FDMA symbol in a subframe, as illustrated in FIG. 13.
A minimum SRS bandwidth is composed of four RBs and other SRS bandwidths may include a multiple of four RBs.
Three bits in a PDCCH system information block (SIB) indicate one of SRS bandwidth configurations. Two bits in the PDCCH SIB indicate one of four SRS bandwidth layers.

Figure 14:
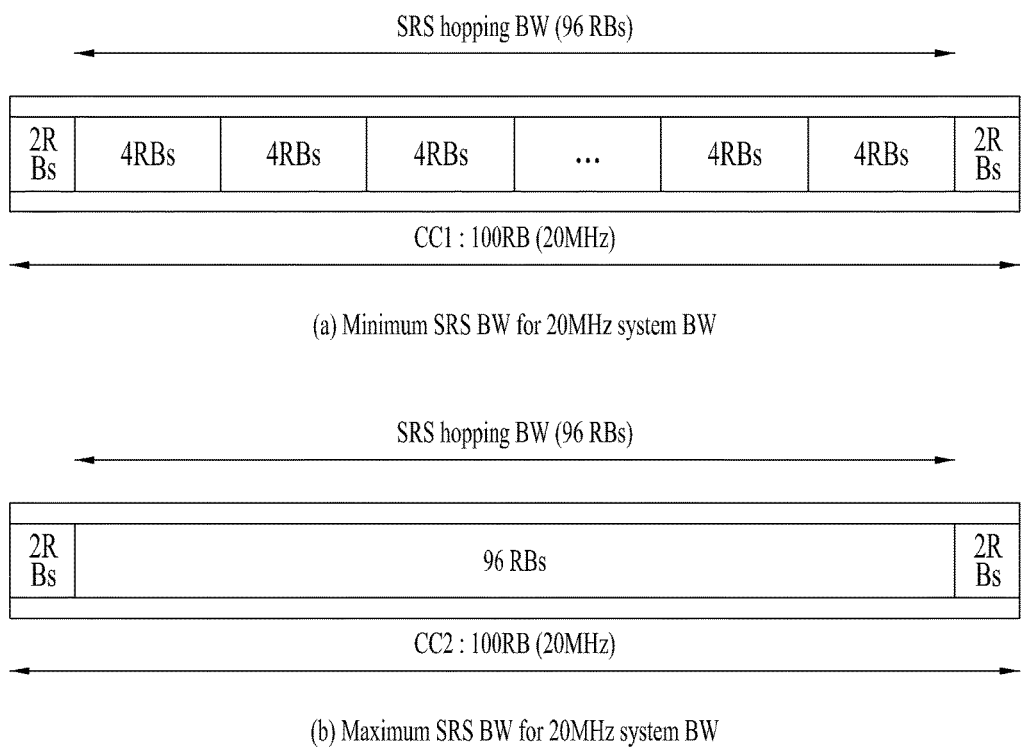
FIG. 14 illustrates minimum SRS bandwidth and maximum SRS bandwidth.

The following UE-specific SRS parameters are configured by higher layers:
starting physical RB assignment
duration of SRS transmission: single or periodic transmission
SRS configuration index I_srs for SRS periodicity and SRS subframe offset
SRS channel bandwidth, frequency hopping bandwidth, cyclic shift value FIG. 14 illustrates minimum SRS bandwidth and maximum SRS bandwidth.

In the frequency domain, an SRS channel bandwidth configuration for a 20 MHz system bandwidth is defined as the following table as illustrated and an SRS starting point k0 is defined by:

$$k_0^{(p)} = \bar{k}_0^{(p)} + \sum_{b=0}^{B_{SRS}} 2M_{sc,b}^{RS} n_b \quad \text{Equation 5}$$

In Equation 5, an initial starting point $$\bar{k}_0^{(p)}$$

may be defined as follows.

$$\bar{k}_0 = (\lfloor N_{RB}^{UL}/2 \rfloor - m_{RSR,0}/2) N_{SC}^{RB} + k_{TC},$$

$$M_{sc,b}^{RS} = m_{SRS,b} N_{sc}^{RB}/2 \quad \text{Equation 6}$$

is the length of an SRS sequence and nb denotes a frequency position index.

Accordingly, the SRS transmission bandwidth is allocated as illustrated in FIG. 14.

Table 1 shows $m_{SRS,b}$ and $N_b$ (where b=0, 1, 2, 3) and values of UL bandwidth (BW) of $$80 < N_{RB}^{UL} \leq 110$$

TABLE 1

| SRS BW configuration | SRS-BW $B_{SRS} = 0$ | | SRS-BW $B_{SRS} = 1$ | | SRS-BW $B_{SRS} = 2$ | | SRS-BW $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In addition, frequency hopping of the SRS is configured by a parameter $b_{hop} \in \{0,1,2,3\}$
provided by higher-layer parameter srs-HoppingBandwidth.

In the time domain, single or periodic SRS transmission is configured by the parameter of SRS_duration. Generally, if periodic SRS transmission is configured for a UE, an eNode B may request that the UE perform individual SRS transmission and the UE may periodically transmit the SRS according to Table 2 defined below.

Table 2 shows UE-specific SRS periodicity $T_{SRS}$ and subframe offset configuration $T_{offset}$.

TABLE 2

| SRS configuration index $I_{SRS}$ | SRS periodicity $T_{SRS}$ (ms) | Subframe offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | This is not currently defined and will be used for other purposes later. | This is not currently defined and will be used for other purposes later. |

Figure 15:
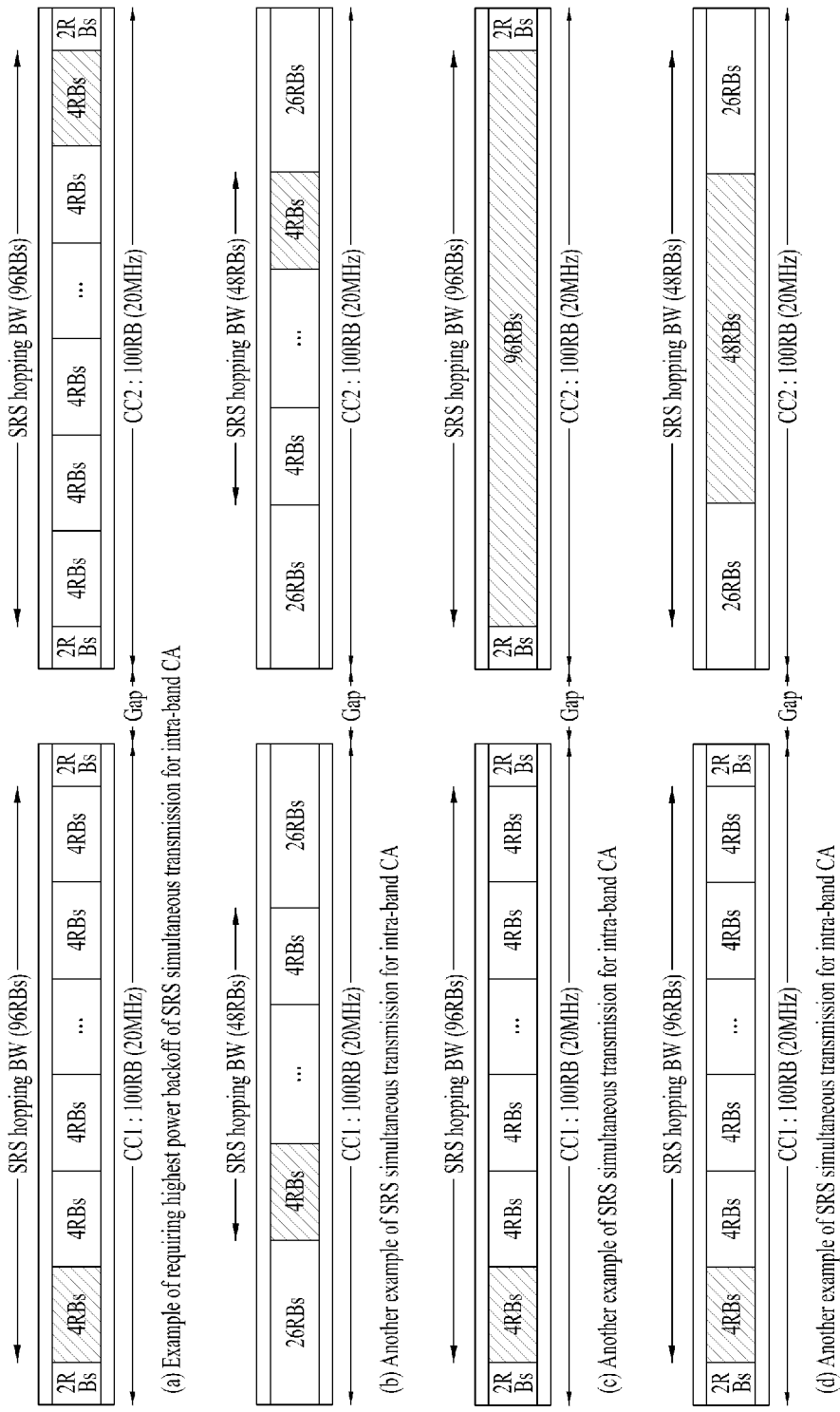
FIG. 15 illustrates various examples of SRS configuration in intra-band CA.
Figure 16:
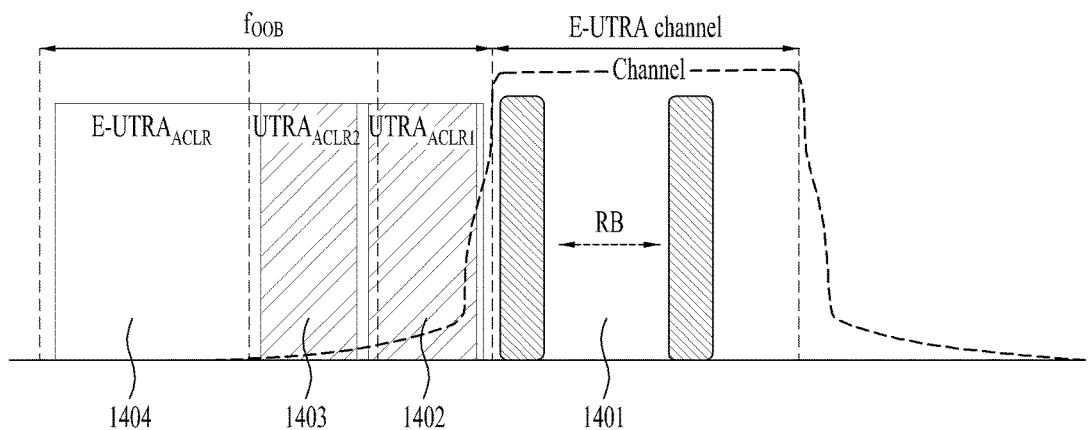
FIG. 16 illustrates an adjacent channel leakage ratio (ACLR).

FIG. 15 illustrates various examples of SRS configuration in intra-band CA and FIG. 16 illustrates an adjacent channel leakage ratio (ACLR).

For SRS configuration in intra-band CA, 3GPP agreed that SRS simultaneous transmission is applicable to a release-10 time frame. In addition, agreements of 3GPP for SRS transmission are listed as follows.

SRS simultaneous transmission is applied to intra-band CA.
SRS and PUSCH/PUCCH simultaneous transmission is not applied to intra-band CA in release-10.
Configuration parameters such as SRS bandwidth, starting position, and cyclic shift are independent per CC.
SRS transmission bandwidth and frequency RB are the same for all antenna ports.
The following Release-8 SRS resources (time/frequency/code) may be reused.
:Cell-specific SRS configuration parameters are applicable to both periodic and aperiodic sounding.

:Aperiodic sounding using release-8 resources is transmitted in cell-specific SRS subframes.

:UE-specific SRS configuration parameters such as SRS bandwidth, starting position, transmission comb, and cyclic shift may be different between periodic and aperiodic sounding.

:periodicity

From SRS simultaneous transmission for intra-band CA and SRS transmission configuration for a single carrier, the worst combination for SRS transmission is illustrated in FIG. 15.

Meanwhile, MPR indicates the amount of power reduction for a maximum transmission power defined with respect to a modulation order or the number of RBs in order to satisfy RF requirements (spurious emission (SE), spectrum emission mask (SEM), adjacent channel leakage ratio (ACLR), inter modulation (IM) 3 or 5, etc.) defined in standards. A-MPR (additional maximum power reduction) indicates the amount of power reduction for a maximum transmission power for satisfying UE-to-UE coexistence defined due to regional characteristics. Accordingly, the maximum power of a UE may be further reduced by applying A-MPR suitable for a circumstance so that the transmission power of the UE is set to a level satisfying requirements determined in a corresponding country for a PS band. To indicate the A-MPR value to the UE, an eNode B signals a network signaling (hereinafter, NS) value. A-MPR values corresponding to NS values are defined in 3GPP standard document TS36.101. That is, each NS indicates an A-MPR value corresponding thereto. Then, the UE restricts a transmission power according to an A-MPR value to transmit a signal. The UE may transmit a signal by restricting a maximum transmission power according to MPR known thereto without NS from the eNode B. This may serve to restrict the maximum transmission power according to an MPR value known to the MS when a UL resource allocated from the eNode B is a normal operating band that does not require NS from the eNode B.

The MPR value is associated with cell coverage and is an important element for determining system throughput of a cell because the MPR value determines the maximum output power of the UE. Therefore, in order to determine a reduction value for this output power, a very careful approach should be implemented. Generally, dominant factors for determining the MPR value are the number of contiguous RBs of an SRS transmitted per CC, a bandwidth gap difference between SRSs, and a power difference between SRSs.

For example, if the number of contiguous RBs gradually decreases, a demanded MPR value increases. In addition, if the bandwidth gap difference between SRSs increases, a demanded MPR value increases. If the power difference between SRSs decreases, a demanded MPR value increases.

As described above, a UE supporting intra-band CA does not perform simultaneous transmission of an SRS and PUSCH/PUCCH. As opposed to a conventional PUSCH/PUCCH set in the unit of one RB, the minimum bandwidth of the SRS is 4 RBs and all SRS channel bandwidths are set to a multiple of 4 RBs. Since the SRS is configured in a region except for the edge of system bandwidth, that is, except for a PUCCH region, SRS hopping bandwidth is configured in a middle part region as illustrated in FIG. 15 and SRS transmission is performed within the SRS hopping bandwidth according to a hopping pattern.

Accordingly, exemplary SRS configuration requiring the highest backoff power using the above result is as illustrated in FIG. 15(a). In consideration of this case, a study for resetting an MPR value to be proposed for an SRS channel of the UE supporting SRS simultaneous transmission is needed.

Hereinafter, the MPR value proposed by the present invention will be described in consideration of the examples illustrated in FIG. 15.

As currently defined in TS36.211, SRS simultaneous transmission may be performed by allocating 4 RBs per CC and SRSs may be separated by two RBs from a bandwidth edge. Considering the above case, an MPR value that is required to meet ACLR, SE, and SEM was evaluated through RF simulation and then compared with a conventional MPR value. Basic RF simulation assumptions and parameters are as follows.

20+20 MHz CC combination with normal channel spacing

Modulator impairments are indicated below.

I/Q imbalance: 25 dBc

Carrier leakage: 25 dBc

Counter IM3: 60 dBc

In this case, I/Q imbalance indicates creation of throughput deterioration due to spreading between symmetrical subcarriers. The unit dBc represents relative magnitude based on the power size of a carrier frequency. Carrier leakage indicates an additional sine waveform with the same frequency as a modulation wave carrier frequency. Counter IM3 indicates a factor induced by a component such as a mixer or an amplifier in an RF system.

ACLR requirements are defined in the following table.

TABLE 3

| Channel | Minimum channel spacing with 1 MHz guard band |
|---|---|
| $UTRA_{ACLR1}$ | 33 dB |
| Adjacent channel center frequency offset (MHz) | $+19 + BW_{UTRA}/2/-19 - BW_{UTRA}/2$ |
| $UTRA_{ACLR2}$ | 36 dB |
| Adjacent channel center frequency offset (MHz) | $+19 + 3 * BW_{UTRA}/2/ -19 - 3 * BW_{UTRA}/2$ |
| UTRA 5 MHz channel measurement bandwidth | 3.84 MHz |
| $E\text{-}UTRA_{ACLR}$ | 30 dB |
| Adjacent channel center frequency offset (MHz) | +38/-38 |
| E-UTRA channel measurement bandwidth | 36 MHz |

In the above table, $UTRA_{ACLR1}$ is an ACLR of leakage to an adjacent channel 1402, that is, a UTRA channel, when a UE performs transmission in an E-UTRA channel 1401 and the adjacent channel 1402 is for UTRA as illustrated in FIG. 16. $UTRA_{ACLR2}$ is an ACLR of leakage to an adjacent channel 1403, that is, a UTRA channel, when the channel 1403 adjacent to the adjacent channel 1402 is for UTRA as illustrated in FIG. 16. $E\text{-}UTRA_{ACLR}$ is an ACLR of leakage to an adjacent channel 1404, that is, a UTRA channel, when the UE performs transmission in the E-UTRA channel 1401 as illustrated in FIG. 16.

Meanwhile, operating bands are listed in Table 4 shown below.

TABLE 4

| E-UTRA operating band | UL operating band $F_{UL\_low}$-$F_{UL\_high}$ | | | | DL operating band $F_{DL\_low}$-$F_{DL\_high}$ | | | | Duplex Mode |
|---|---|---|---|---|---|---|---|---|---|
| 1 | 1920 | MHz | 1980 | MHz | 2110 | MHz | 2170 | MHz | FDD |
| 2 | 1850 | MHz | 1910 | MHz | 1930 | MHz | 1990 | MHz | FDD |
| 3 | 1710 | MHz | 1785 | MHz | 1805 | MHz | 1880 | MHz | FDD |
| 4 | 1710 | MHz | 1755 | MHz | 2110 | MHz | 2155 | MHz | FDD |
| 5 | 824 | MHz | 849 | MHz | 869 | MHz | 894 | MHz | FDD |
| 6 | 830 | MHz | 840 | MHz | 875 | MHz | 885 | MHz | FDD |
| 7 | 2500 | MHz | 2570 | MHz | 2620 | MHz | 2690 | MHz | FDD |
| 8 | 880 | MHz | 915 | MHz | 925 | MHz | 960 | MHz | FDD |
| 9 | 1749.9 | MHz | 1784.9 | MHz | 1844.9 | MHz | 1879.9 | MHz | FDD |
| 10 | 1710 | MHz | 1770 | MHz | 2110 | MHz | 2170 | MHz | FDD |
| 11 | 1427.9 | MHz | 1447.9 | MHz | 1475.9 | MHz | 1495.9 | MHz | FDD |
| 12 | 699 | MHz | 716 | MHz | 729 | MHz | 746 | MHz | FDD |
| 13 | 777 | MHz | 787 | MHz | 746 | MHz | 756 | MHz | FDD |
| 14 | 788 | MHz | 798 | MHz | 758 | MHz | 768 | MHz | FDD |
| 15 | Reserved | | | | Reserved | | | | FDD |
| 16 | Reserved | | | | Reserved | | | | FDD |
| 17 | 704 | MHz | 716 | MHz | 734 | MHz | 746 | MHz | FDD |
| 18 | 815 | MHz | 830 | MHz | 860 | MHz | 875 | MHz | FDD |
| 19 | 830 | MHz | 845 | MHz | 875 | MHz | 890 | MHz | FDD |
| 20 | 832 | MHz | 862 | MHz | 791 | MHz | 821 | MHz | FDD |
| 21 | 1447.9 | MHz | 1462.9 | MHz | 1495.9 | MHz | 1510.9 | MHz | FDD |
| 22 | 3410 | MHz | 3490 | MHz | 3510 | MHz | 3590 | MHz | FDD |
| 23 | 2000 | MHz | 2020 | MHz | 2180 | MHz | 2200 | MHz | FDD |
| 24 | 1626.5 | MHz | 1660.5 | MHz | 1525 | MHz | 1559 | MHz | FDD |
| 25 | 1850 | MHz | 1915 | MHz | 1930 | MHz | 1995 | MHz | FDD |
| ... | | | | | | | | | |
| 33 | 1900 | MHz | 1920 | MHz | 1900 | MHz | 1920 | MHz | TDD |
| 34 | 2010 | MHz | 2025 | MHz | 2010 | MHz | 2025 | MHz | TDD |
| 35 | 1850 | MHz | 1910 | MHz | 1850 | MHz | 1910 | MHz | TDD |
| 36 | 1930 | MHz | 1990 | MHz | 1930 | MHz | 1990 | MHz | TDD |
| 37 | 1910 | MHz | 1930 | MHz | 1910 | MHz | 1930 | MHz | TDD |
| 38 | 2570 | MHz | 2620 | MHz | 2570 | MHz | 2620 | MHz | TDD |
| 39 | 1880 | MHz | 1920 | MHz | 1880 | MHz | 1920 | MHz | TDD |
| 40 | 2300 | MHz | 2400 | MHz | 2300 | MHz | 2400 | MHz | TDD |
| 41 | 2496 | MHz | 2690 | MHz | 2496 | MHz | 2690 | MHz | TDD |
| 42 | 3400 | MHz | 3600 | MHz | 3400 | MHz | 3600 | MHz | TDD |
| 43 | 3600 | MHz | 3800 | MHz | 3600 | MHz | 3800 | MHz | TDD |

In Table 4, $F_{UL\_low}$ indicates the lowest frequency of a UL operating band and $F_{UL\_high}$ indicates the highest frequency of the UL operating band. $F_{DL\_low}$ indicates the lowest frequency of a DL operating band and $F_{DL\_high}$ indicates the highest frequency of the DL operating band.

Meanwhile, for SEM requirements, SE requirements defined in Table 5 shown below are used.

That is, basic SE that should not be exceeded according to a frequency range is summarized as follows.

TABLE 5

| Frequency range | Maximum level | Measurement BW |
|---|---|---|
| 9 kHz ≤ f < 150 kHz | −36 dBm | 1 kHz |
| 150 kHz ≤ f < 30 MHz | −36 dBm | 10 kHz |
| 30 MHz ≤ f < 1000 MHz | −36 dBm | 100 kHz |
| 1 GHz ≤ f < 12.75 GHz | −30 dBm | 1 MHz |

For an SEM for CA, an E-UTRA CA SEM defined in the following Table 6 for band class C (multi-cluster transmission in multiple CCs) is used.

TABLE 6

| | Spectrum emission limit [dBm]/BW$_{Channel\_CA}$ | | | | |
|---|---|---|---|---|---|
| $\Delta f_{OOB}$(MHz) | 29.9 MHz | 30 MHz | 39.8 MHz | | Measurement bandwidth |
| ±0-1 | −22.5 | −22.5 | 24 | | 30 kHz |
| ±1-5 | −10 | −10 | −10 | | 1 MHz |

TABLE 6-continued

| | Spectrum emission limit [dBm]/BW$_{Channel\_CA}$ | | | |
|---|---|---|---|---|
| $\Delta f_{OOB}$(MHz) | 29.9 MHz | 30 MHz | 39.8 MHz | Measurement bandwidth |
| ±5-29.9 | −13 | −13 | −13 | 1 MHz |
| ±29.9-30 | −25 | −13 | −13 | 1 MHz |
| ±30-34.9 | −25 | −25 | −13 | 1 MHz |
| ±34.9-35 | | −25 | −13 | 1 MHz |
| ±35-39.8 | | | −13 | 1 MHz |
| ±39.8-44.8 | | | −25 | 1 MHz |

In Table 6, $\Delta f_{OOB}$ is a frequency of out-of-band emission and dBm is a unit indicating power (Watt) in which 1 mW=0 dBm.

Optimal MPR values only for an SRS channel in order for an LTE-A UE to support SRS simultaneous transmission are obtained as follows through the above parameters. The following Table 7 and Table 8 show MPR values obtained in consideration of the worst case among various SRS configurations. The UE may easily apply the MPR values using a mathematical equation. Table 7 shows MPR values demanded in the worst case.

TABLE 7

| L_CRB$_{CC1}$ [RBs] | L_CRB$_{CC2}$ [RBs] | Conventionally proposed MPR [dB] | MPR[dB] proposed in the present invention | |
|---|---|---|---|---|
| | | | Hopping BW (96 + 96) | Hopping BW (48 + 48) |
| 4 | 4 | 7.2 | 5.93 | 5.448 |
| 4 | 8 | 7.04 | 4.92 | |
| 4 | 16 | 6.4 | 3.168 | |
| 4 | 32 | 5.12 | 2.987 | |
| 4 | 48 | 3.965 | 2.953 | 2.123 |
| 4 | 64 | 3.698 | 2.972 | |
| 4 | 76 | 3.498 | 2.973 | |
| 4 | 84 | 3.482 | 2.972 | |
| 4 | 96 | 3.415 | 2.967 | |

In Table 7, L_CRB$_{CC1}$ and L_CRB$_{CC2}$ indicate the numbers of RBs of respective CCs.

The values shown in Table 7 may be summarized as the following Table 8 and Equation 7.

TABLE 8

| A = N$_{RB\_alloc}$/N$_{RB\_agg}$ | | | | |
|---|---|---|---|---|
| | 0 | 0.06 | 0.1 | 1 |
| Mask limit (dB) | 6.0 | 5.0 | 3.2 | 3 |

$$MPR = 6.0, \quad 0 < A \leq 0.04$$
$$= 7.87 - 46.7A, \quad 0.04 < A \leq 0.1 \quad \text{Equation 7}$$
$$= 3.22 - 0.2A, \quad 0.1 < A \leq 1$$

N$_{RB\_agg}$ is the number of RBs in a channel bandwidth and N$_{RB\_alloc}$ is the total number of simultaneously transmitted RBs.

The MPR values may be prestored by a UE although the MPR values are not indicated by an eNode B through NS. That is, if the band of the allocated UL resource is a normal operating band which does not require NS, the MPR values prestored by the UE may be used. Alternatively, in order to indicate A-MPR values to the UE, the eNode B may signal an NS value.

As described above, when there is a band to be protected in an adjacent frequency region, such as operating band 13 or operating band 26, reduction in a maximum output power of the UE has been defined through power backoff of the UE by A-MPR.

Especially, the UE supporting intra-contiguous CA transmits and receives two CCs using one RF chain. In this case, since an MPR scheme for restricting a maximum output power is applied, there is a probability of reducing the coverage of the eNode B.

Therefore, an SRS transmitted by the UE in order to overcome such a disadvantage may be independently transmitted by applying MPR different from a conventional channel so that the influence of reduction of cell coverage caused by conventional MPR can be reduced.

In other words, when an LTE-A UE supporting CA, which is one main technique for 3GPP LTE-A, performs multi-cluster simultaneous transmission, according to the present invention, cell coverage can be enlarged by independently applying MPR for an SRS to CCs constituting a heterogeneous network supporting CA or to eNode Bs performing a COMP operation, as opposed to a conventional scheme, during SRS transmission for informing an eNode B of channel state information between the eNode B and the UE according to geographic location of the UE.

Especially, when COMP communication is performed for one UE, the SRS transmission power of each eNode B may be independently set separately from backoff applied to another channel. Accordingly, the eNode B is selectively configured according to the quality of a received signal level of the UE and thus an excellent service for the UE can be ensured. In this COMP scenario, one cell having a superior SRS signal can be selected from among equal intra-frequency cells supporting COMP communication and excellent throughput can be obtained by using an adaptive modulation coding (AMC) scheme of increasing a data rate in a cell having the best SRS reception level and decreasing the data rate in the other cells according to the quality of SRSs of two cells.

Since the above-described SRS is a UL signal, cell coverage can be extended in terms of UL. Hereinbelow, extension of cell coverage in terms of DL will be described.

Figure 17:
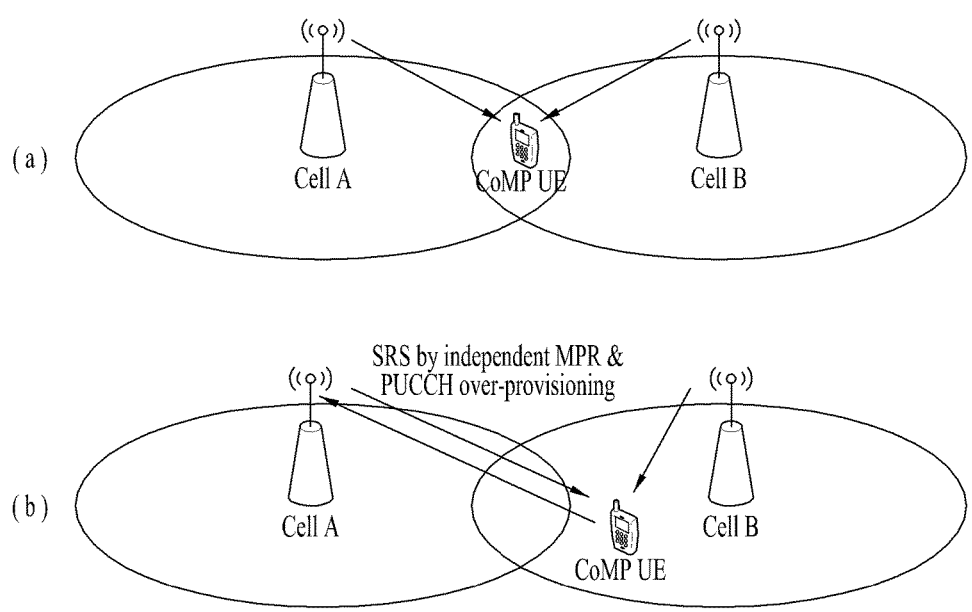
FIG. 17 illustrates the concept of a COMP operation of two eNode Bs and the application of independent MPR for an SRS in terms of UL and the use of PUCCH over-provisioning in terms of DL to extend cell coverage during a COMP operation.

FIG. 17 illustrates the concept of a COMP operation of two eNode Bs and the application of independent MPR for an SRS in terms of UL and the use of PUCCH over-provisioning in terms of DL to extend cell coverage during a COMP operation. FIG. 18 illustrates in detail the concept of PUCCH over-provisioning to protect an adjacent channel in DL.

As can be appreciated with reference to FIG. 17(a), COMP serves to increase data throughput by transmitting the same data or different data per layer in two or more nodes in order to transmit the same data.

If a UE is located in an overlapping region of two eNode Bs as illustrated in FIG. 17(a), the UE receives data from the two eNode Bs as in a conventional scheme. However, if the UE moves to a region adjacent of Cell B, since the UE is out of the coverage region of Cell A, the UE performs communication by searching for a superior cell through cell selection rather than performing COMP communication.

However, if independent MPR only for an SRS is used as described previously, since the SRS is transmitted with a higher transmission power than a conventionally used transmission power, the UL coverage of cell A can be extended.

However, since data for UL control, that is, PUCCH/PUSCH data, may not be correctly received in the cell coverage extended region due to SRS transmission with a high power, PUCCH over-provisioning may be performed as illustrated in FIG. 18. Namely, a control channel is inserted into the inner side of the frequency domain instead of being allocated to the edge of the frequency domain so that data in a control region is robustly protected in a fading channel. As a result, superior communication quality can be provided. Therefore, DL cell coverage can be extended and superior throughput can be obtained.

Meanwhile, the concept of extending cell coverage may be applied to a heterogeneous network. For example, when heterogeneous eNode Bs, that is, a picocell and a macrocell, support intra-contiguous CA, if the UE is located within the coverage of the picocell, SRS transmission with maximum output to the macrocell enables CA in both the macrocell and the picocell. This will be described below in more detail.

FIG. 19a to FIG. 19e illustrate various scenarios of extending cell coverage using independent MPR and PUCCH over-provisioning for an SRS according to the present invention, when heterogeneous eNode Bs support intra-band CA. FIG. 20 illustrates another exemplary scenario of FIG. 19.

Referring to 19a, F1 and F2 denote cells and are co-located and overlaid while providing almost the same coverage. Cells F1 and F2 provide sufficient coverage and mobility therebetween can be supported. For example, cells F1 and F2 may use the same band, for example, 2 GHz or 800 MHz.

Figure 19B:
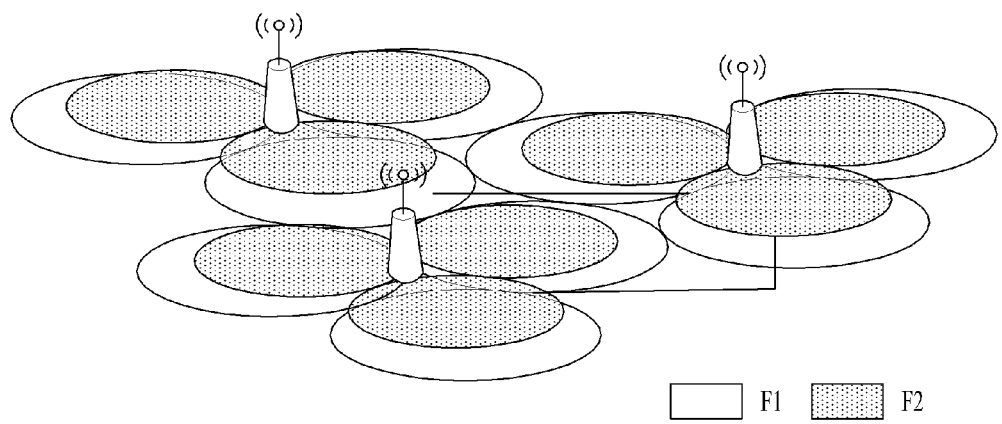
Figure 20:
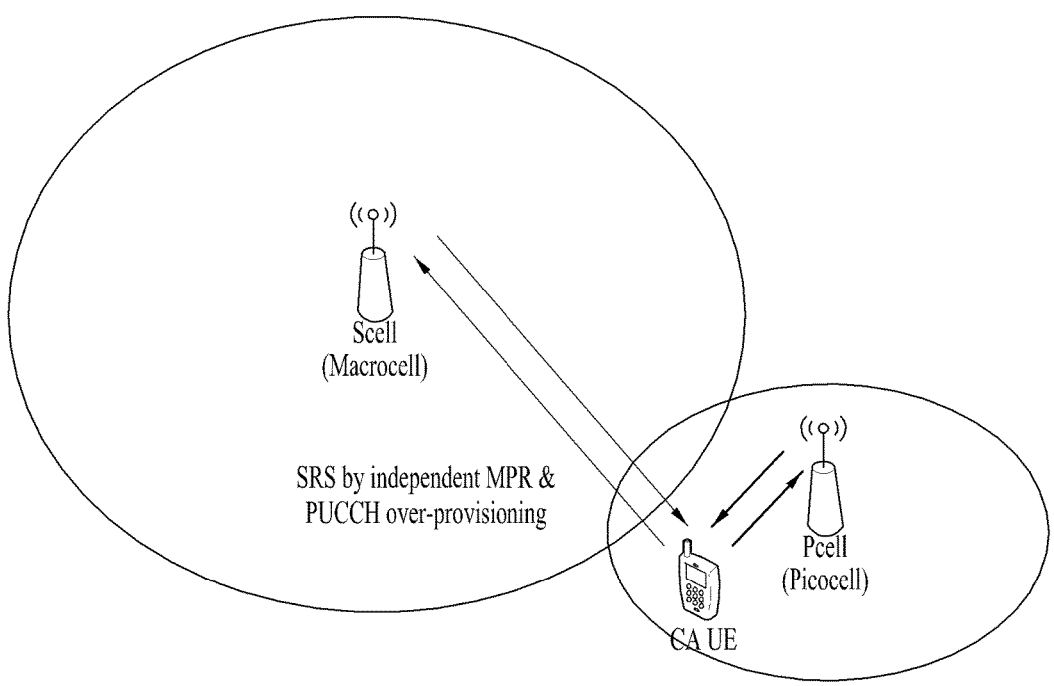
FIG. 20 illustrates another exemplary scenario of FIG. 19.

Next, referring to FIG. 19b, cells F1 and F2 are co-located and overlaid. However, it is assumed that the coverage of cell F2 is smaller than the coverage of cell F1 due to path loss. In this case, only cell F1 provides sufficient coverage, whereas cell F2 may be used to improve throughput. Mobility is performed based on the coverage of cell F1 and cells F1 and F2 may use different bands, for example, F1={800 MHz, 2 GHz} and F2={3.5 GHz}.

Figure 19C:
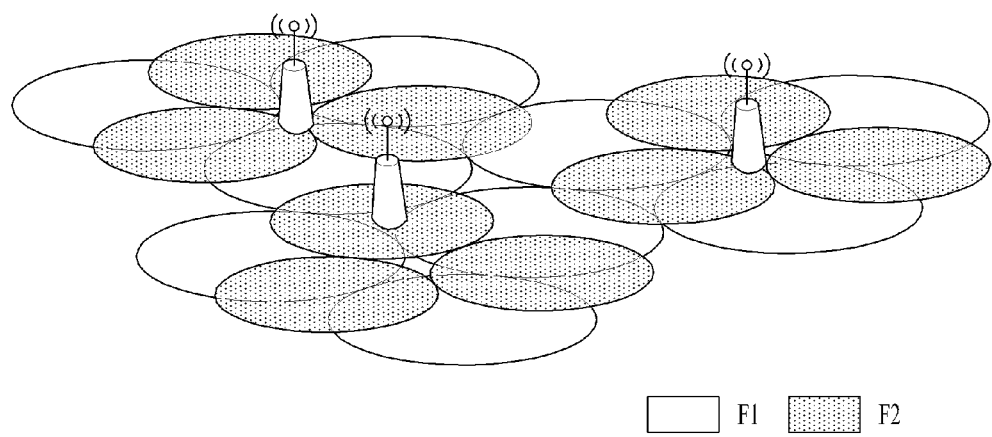

Referring to FIG. 19c, cells F1 and F2 are co-located. However, antennas of cell F2 are directed towards the cell boundary of cell F1, thereby improving cell edge throughput. While only cell F1 provides sufficient coverage, cell F2 may be used to fill an empty space of coverage. Mobility is performed based on the coverage of cell F1 and cells F1 and F2 may use different bands, for example, F1={800 MHz, 2 GHz} and F2={3.5 GHz}.

Figure 19D:
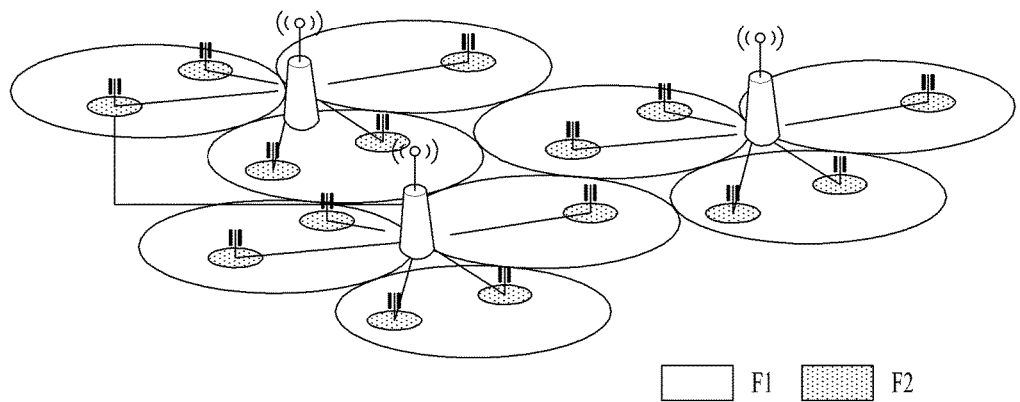

Next, referring to FIG. 19d, cell F1 provides macro coverage and remote radio heads (RRHs) of cell F2 are used to improve throughput at hot spots. Mobility is performed based on the coverage of cell F1 and cells F1 and F2 may use different bands, for example, F1={800 MHz, 2 GHz} and F2={3.5 GHz}.

Figure 19E:
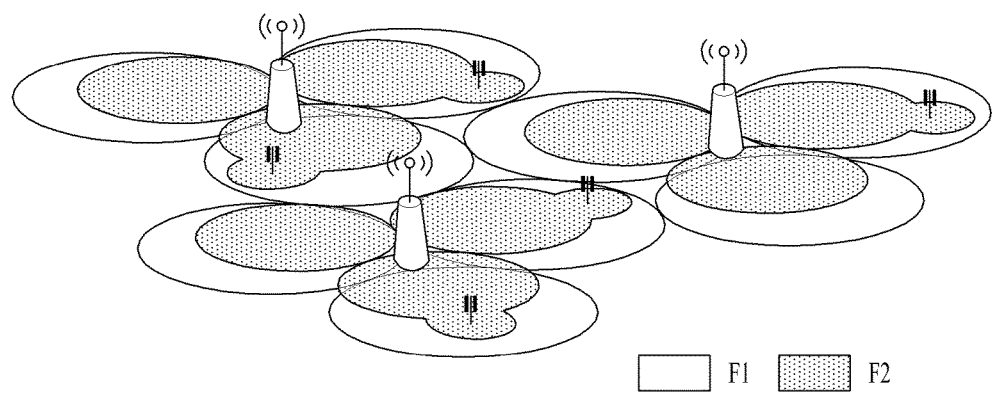

Referring to FIG. 19e, frequency selective repeaters are deployed to extend coverage for one of carrier frequencies, similarly to FIG. 19(b).

CA can be supported in the above various examples. Generally, a CA scenario known as inter-frequency heterogeneous network, that is, the scenario illustrated in FIG. 19d, may be also used in intra-contiguous CA scenario.

In the scenario illustrated in FIG. 19d, if the UE is out of a macrocell region as illustrated in FIG. 20, independent MPR only for the SRS may be used to continue to maintain CA without deactivating a secondary cell so that UL cell coverage can be extended. If the UE moves into the macrocell region, MPR applied to another channel may be used without using independent MPR only for the SRS. Thus, the coverage of the macrocell can be reduced. In other words, cell coverage can be extended or reduced depending upon whether independent MPR for the SRS is used. This is called cell breathing.

In order for the UE to correctly receive a DL control channel, PUCCH over-provisioning may be applied. Then, even when the UE is out of the macrocell region, the secondary cell may not be deactivated and, thus, intra-contiguous CA can be continuously supported in two CCs.

As described hereinabove, the present invention can prevent reduction of cell coverage caused by conventional MPR by applying independent MPR only for an SRS without using MPR for restricting a maximum output power of the UE performing multi-cluster simultaneous transmission in CA which is currently discussed in 3GPP WG RAN4.

The embodiments of the present invention may be achieved by various means, for example, hardware, firmware, software, or a combination thereof.

In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Figure 21:
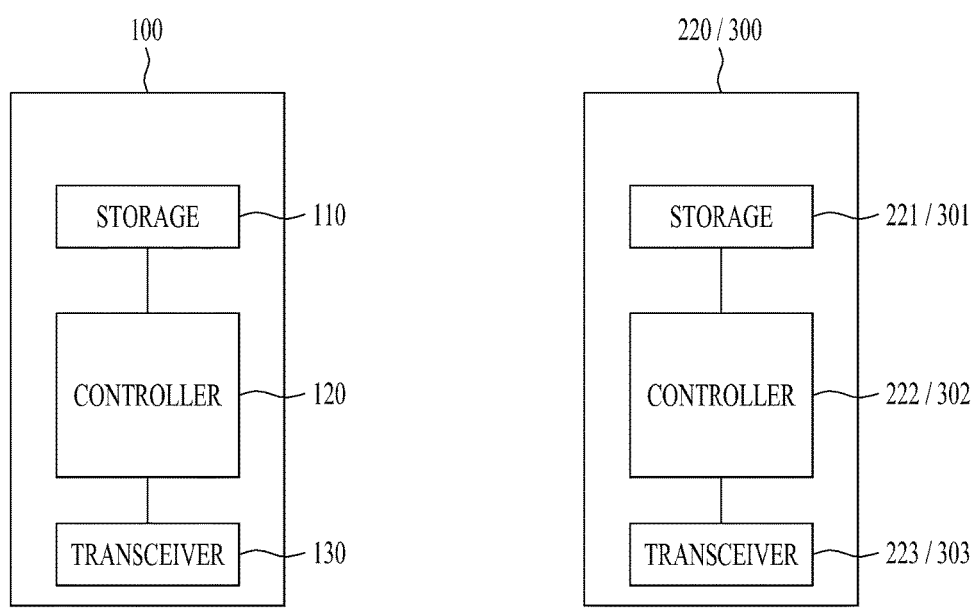
FIG. 21 is a block diagram of the UE 100 and an eNode B 220/300 according to the present invention.

FIG. 21 is a block diagram of the UE 100 and an eNode B 220/300 according to the present invention.

As illustrated in FIG. 21, the UE 100 includes a storage 110, a controller 120, and a transceiver 130. The eNode B 220/300 is a macro eNode B or a pico/femto eNode B and includes a storage 221/301, a controller 222/302, and a transceiver 223/303.

The storage 110 (or 221/301) stores the methods illustrated in FIGS. 11 to 20. The transceiver 130 (or 222/302) transmits and receives the above-described signals.

The controller 120 (or 222/302) controls the storage and the transceiver. Specifically, the controller executes the methods stored in the storage.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. In addition, it is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention are applicable to a UE, an eNode B, or other equipment in a wireless mobile communication system.

The invention claimed is:

1. A method for transmitting, by a user equipment (UE), a signal in a wireless communication system, the method comprising:
configuring first and second maximum power reduction (MPR) values for transmitting signals;
determining a first transmission power for a sounding reference signal (SRS) by using one of the first and the second MPR values, wherein the first MPR value is different from the second MPR value; and
transmitting the SRS with the first transmission power and a physical uplink control channel (PUCCH) with a second transmission power determined by using the second MPR value,
wherein the first transmission power is determined by using the first MPR value if the UE is out of coverage of a first cell and the UE is in coverage of a second cell,
wherein the first transmission power is determined by using the second MPR value if the UE is in coverage of both of the first cell and the second cell,
wherein the PUCCH is transmitted in a frequency region other than an edge of a system bandwidth if the UE is out of coverage of the first cell and the UE is in coverage of the second cell, and wherein the PUCCH is transmitted in the edge of the system bandwidth if the UE is in coverage of both of the first cell and the second cell.

2. The method according to claim 1, wherein each of the first cell and the second cell is one of a plurality of component carriers in a carrier aggregation scenario.

3. The method according to claim 1, wherein the first cell and the second cell perform a coordinated multi-point (COMP) operation with each other.

4. The method according to claim 1, wherein the first cell is a primary cell and the second cell is a secondary cell, or the first cell is a macrocell and the second cell is a picocell.

5. A user equipment (UE) configured to transmit a signal in a wireless communication system, the UE comprising:
a radio frequency (RF) unit; and
a processor configured to:
configure first and second maximum power reduction (MPR) values for transmitting signals,
determine a first transmission power for a sounding reference signal (SRS) by using one of the first and the second MPR values, wherein the first MPR value is different from the second MPR value, and
control the RF unit to transmit the SRS with the first transmission power and a physical uplink control channel (PUCCH) with a second transmission power determined by using the second MPR value,
wherein the processor determines the first transmission power by using the first MPR value if the UE is out of coverage of a first cell and the UE is in coverage of a second cell,
wherein the processor determines the first transmission power by using the second MPR value if the UE is in coverage of both of the first cell and the second cell,
wherein the PUCCH is transmitted in a frequency region other than an edge of a system bandwidth if the UE is out of coverage of the first cell and the UE is in coverage of the second cell, and
wherein the PUCCH is transmitted in the edge of the system bandwidth if the UE is in coverage of both of the first cell and the second cell.

6. A method for controlling, by a serving cell, a transmission power of a user equipment (UE) in a wireless communication system, the method comprising:
configuring first and second maximum power reduction (MPR) values for transmitting signals;
indicating the first and the second MPR values to the UE, wherein the first MPR value is different from the second MPR value; and
receiving a sounding reference signal (SRS) with a first transmission power determined by using one of the first and the second MPR values, and a physical uplink control channel (PUCCH) with a second transmission power determined by using the second MPR value,
wherein the first transmission power is determined by using the first MPR value if the UE is out of coverage of the serving cell and the UE is in coverage of another cell,
wherein the first transmission power is determined by using the second MPR value if the UE is in coverage of both of the serving cell and the another cell,
wherein the PUCCH is transmitted in a frequency region other than an edge of a system bandwidth if the UE is out of coverage of the first cell and the UE is in coverage of the second cell, and
wherein the PUCCH is transmitted in the edge of the system bandwidth if the UE is in coverage of both of the first cell and the second cell.

7. A serving cell configured to control a transmission power of a user equipment (UE) in a wireless communication system, the serving cell comprising:
a radio frequency (RF) unit; and
a processor configured to:
configure first and second maximum power reduction (MPR) values for transmitting signals,
indicate the first and the second MPR values to the UE, wherein the first MPR value is different from the second MPR value, and
receive a sounding reference signal (SRS) with a first transmission power determined by using one of the first and the second MPR values, and a physical uplink control channel (PUCCH) with a second transmission power determined by using the second MPR value,
wherein the first transmission power is determined by using the first MPR value if the UE is out of coverage of the serving cell and the UE is in coverage of another cell,
wherein the first transmission power is determined by using the second MPR value if the UE is in coverage of the serving cell and the another cell,
wherein the PUCCH is transmitted in a frequency region other than an edge of a system bandwidth if the UE is out of coverage of the first cell and the UE is in coverage of the second cell, and
wherein the PUCCH is transmitted in the edge of the system bandwidth if the UE is in coverage of both of the first cell and the second cell.

* * * * *